US008928846B2

United States Patent
Kubota et al.

(10) Patent No.: US 8,928,846 B2
(45) Date of Patent: Jan. 6, 2015

(54) LIQUID CRYSTAL DISPLAY DEVICE HAVING DIELECTRIC FILM OVER AND IN CONTACT WITH WALL-LIKE STRUCTURES

(75) Inventors: Daisuke Kubota, Kanagawa (JP); Akio Yamashita, Kanagawa (JP); Tetsuji Ishitani, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 224 days.

(21) Appl. No.: 13/104,221

(22) Filed: May 10, 2011

(65) Prior Publication Data
US 2011/0285929 A1 Nov. 24, 2011

(30) Foreign Application Priority Data
May 21, 2010 (JP) ................. 2010-116954

(51) Int. Cl.
G02F 1/1337 (2006.01)
G02F 1/1343 (2006.01)
G02F 1/1339 (2006.01)
G02F 1/137 (2006.01)

(52) U.S. Cl.
CPC ...... *G02F 1/134363* (2013.01); *G02F 1/13394* (2013.01); *G02F 2001/13793* (2013.01); *G02F 2001/13398* (2013.01)
USPC ........... 349/141; 349/129; 349/155; 349/156; 349/157

(58) Field of Classification Search
USPC .................. 349/141, 129, 155–157
See application file for complete search history.

(56) References Cited

U.S. PATENT DOCUMENTS

| | | | |
|---|---|---|---|
| 4,409,134 A | 10/1983 | Yamazaki | |
| 5,181,132 A * | 1/1993 | Shindo et al. | 349/155 |
| 5,517,344 A | 5/1996 | Hu et al. | |
| 6,097,465 A | 8/2000 | Hiroki et al. | |
| 6,137,559 A | 10/2000 | Tanaka et al. | |
| 6,175,395 B1 | 1/2001 | Yamazaki et al. | |
| 6,222,603 B1 | 4/2001 | Sakai et al. | |
| 6,429,914 B1 | 8/2002 | Kubota et al. | |

(Continued)

FOREIGN PATENT DOCUMENTS

| | | |
|---|---|---|
| CA | 2 560 342 | 8/2009 |
| CN | 101211082 A | 7/2008 |

(Continued)

OTHER PUBLICATIONS

Chinese Office Action (Application No. 201110149453.7) Dated Sep. 25, 2014.

*Primary Examiner* — Lauren Nguyen
(74) *Attorney, Agent, or Firm* — Nixon Peabody LLP; Jeffrey L. Costellia

(57) ABSTRACT

An object is to provide a liquid crystal display device a driving voltage of which is reduced, which is formed using a liquid crystal material exhibiting a blue phase, and which enables higher contrast. In a liquid crystal display device including a liquid crystal layer exhibiting a blue phase, a first wall-like structure body is formed over a first electrode layer (pixel electrode layer), a second wall-like structure body is provided over a second electrode layer (common electrode layer), and a dielectric film covers them. The dielectric film is an insulator having a higher dielectric constant than the first wall-like structure body, the second wall-like structure body, and a liquid crystal material used for the liquid crystal layer, and is provided so as to protrude in the liquid crystal layer.

17 Claims, 18 Drawing Sheets

(56) References Cited

U.S. PATENT DOCUMENTS

| | | |
|---|---|---|
| 6,576,926 B1 | 6/2003 | Yamazaki et al. |
| 6,628,253 B1 | 9/2003 | Hiroki |
| 6,630,969 B2 | 10/2003 | Kubota et al. |
| 6,831,725 B2 | 12/2004 | Niiya |
| 7,057,695 B2 | 6/2006 | Mun et al. |
| 7,084,840 B2 | 8/2006 | Moon |
| 7,193,678 B2 | 3/2007 | Ueyama |
| 7,209,204 B2 | 4/2007 | Mun et al. |
| 7,211,825 B2 | 5/2007 | Shih et al |
| 7,327,433 B2 | 2/2008 | Miyachi et al. |
| 7,342,632 B2 | 3/2008 | Miyachi et al. |
| 7,486,364 B2 | 2/2009 | Mun et al. |
| 7,525,621 B2 | 4/2009 | Mun et al. |
| 7,564,526 B2 | 7/2009 | Mun et al. |
| 7,576,829 B2 | 8/2009 | Kikuchi et al. |
| 7,623,215 B2 | 11/2009 | Motomatsu |
| 7,639,332 B2 | 12/2009 | Miyachi et al. |
| 7,639,337 B2 | 12/2009 | Mun et al. |
| 7,791,074 B2 | 9/2010 | Iwasaki |
| 8,102,498 B2 | 1/2012 | Kanaya et al. |
| 8,164,718 B2 | 4/2012 | Fujikawa et al. |
| 8,400,590 B2 | 3/2013 | Fujikawa et al. |
| 2004/0160566 A1 | 8/2004 | Kawabe et al. |
| 2005/0007536 A1* | 1/2005 | Hirakata et al. ............. 349/143 |
| 2005/0122465 A1 | 6/2005 | Togashi |
| 2005/0179847 A1 | 8/2005 | Miyachi et al. |
| 2006/0203169 A1 | 9/2006 | Ozawa et al. |
| 2006/0209245 A1 | 9/2006 | Mun et al. |
| 2006/0227283 A1 | 10/2006 | Ooi et al. |
| 2006/0285060 A1* | 12/2006 | Misaki et al. ................. 349/156 |
| 2007/0095468 A1 | 5/2007 | Kim et al. |
| 2007/0126969 A1 | 6/2007 | Kimura et al. |
| 2008/0259254 A1 | 10/2008 | Kikuchi et al. |
| 2008/0266509 A1 | 10/2008 | Nishi et al. |
| 2008/0284964 A1 | 11/2008 | Mun et al. |
| 2009/0045397 A1 | 2/2009 | Iwasaki |
| 2009/0153761 A1 | 6/2009 | Park et al. |
| 2009/0219478 A1* | 9/2009 | Park et al. ..................... 349/155 |
| 2009/0322997 A1 | 12/2009 | Kaihoko et al. |
| 2010/0039605 A1 | 2/2010 | Zhao et al. |
| 2010/0053485 A1 | 3/2010 | Mun et al. |
| 2010/0165280 A1 | 7/2010 | Ishitani et al. |
| 2010/0195028 A1 | 8/2010 | Kubota et al. |
| 2010/0245724 A1 | 9/2010 | Nishi et al. |
| 2010/0276689 A1 | 11/2010 | Iwasaki |
| 2010/0279462 A1 | 11/2010 | Iwasaki |
| 2010/0326592 A1 | 12/2010 | Ishitani et al. |
| 2010/0328565 A1 | 12/2010 | Kubota et al. |
| 2011/0122332 A1 | 5/2011 | Kubota et al. |
| 2011/0128491 A1 | 6/2011 | Kubota et al. |
| 2011/0134350 A1 | 6/2011 | Yamazaki et al. |

FOREIGN PATENT DOCUMENTS

| | | |
|---|---|---|
| CN | 101576669 A | 11/2009 |
| CN | 101661178 A | 3/2010 |
| EP | 1 743 931 A1 | 1/2007 |
| JP | 2008-112022 | 5/2008 |
| WO | WO 2005-090520 A1 | 9/2005 |

* cited by examiner

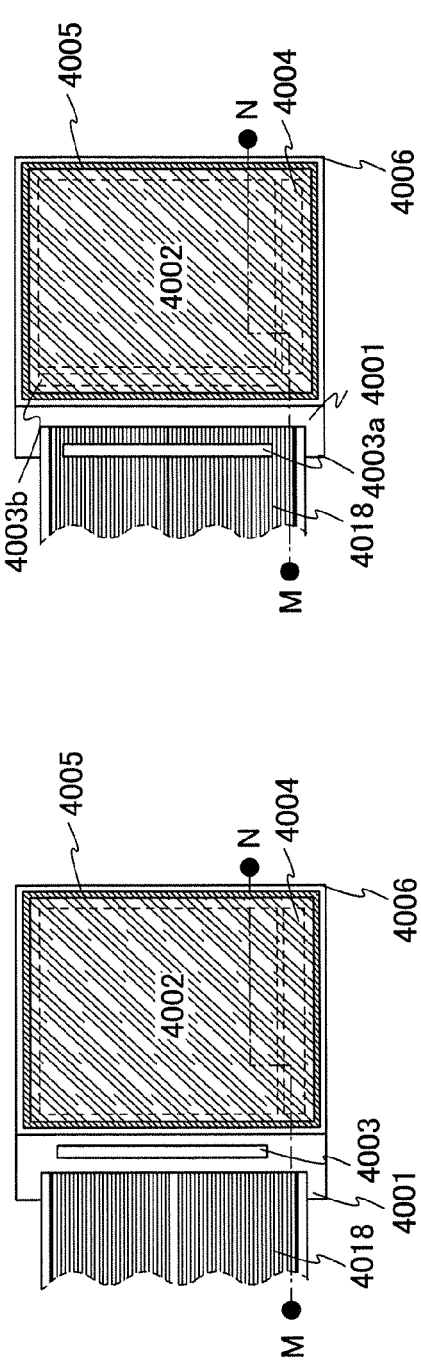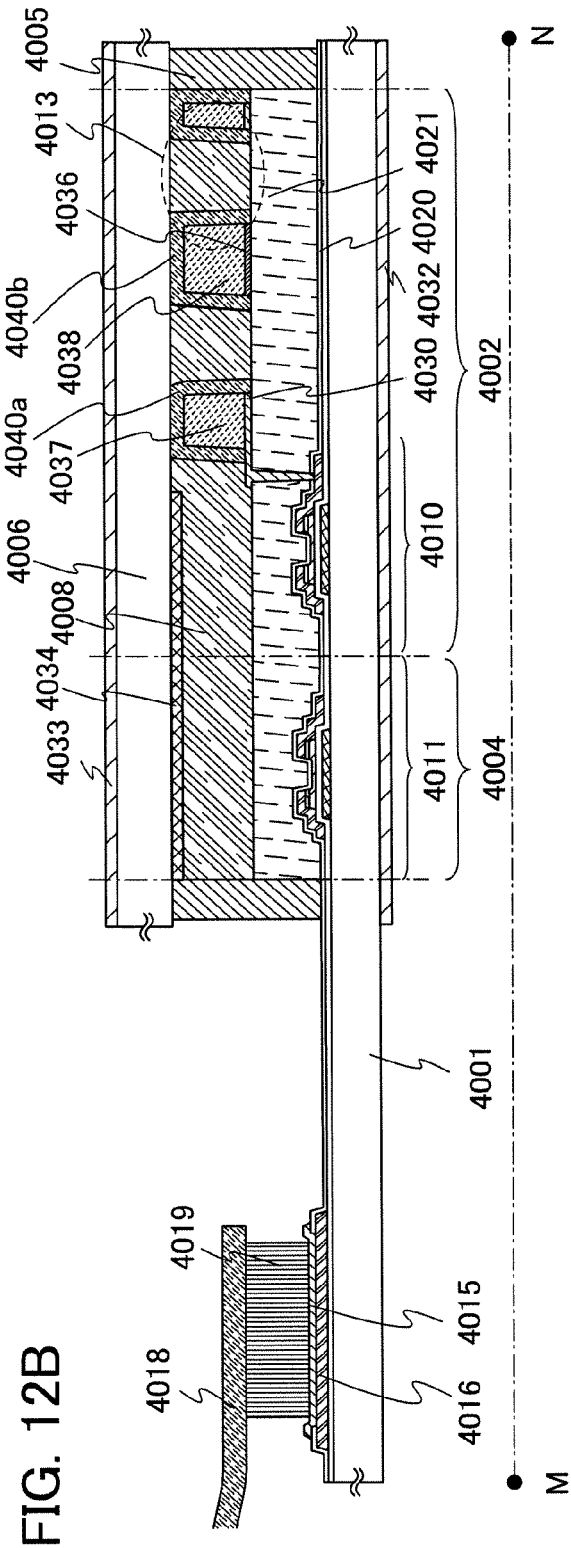

LIQUID CRYSTAL DISPLAY DEVICE HAVING DIELECTRIC FILM OVER AND IN CONTACT WITH WALL-LIKE STRUCTURES

BACKGROUND OF THE INVENTION

1. Field of the Invention

The present invention relates to a liquid crystal display device and a method for manufacturing the liquid crystal display device.

2. Description of the Related Art

As display devices which are thin and lightweight (so-called flat panel displays), liquid crystal display devices including liquid crystal elements, light-emitting devices including self light-emitting elements, field emission displays (FEDs), and the like have been competitively developed.

In liquid crystal display devices, response speed of liquid crystal molecules is required to be increased. Among various kinds of display modes of liquid crystal, a ferroelectric liquid crystal (FLC) mode, an optical compensated birefringence (OCB) mode, and a mode using a liquid crystal exhibiting a blue phase can be given as liquid crystal modes by which high-speed response is possible.

When the mode using liquid crystal exhibiting a blue phase is employed, an alignment film is not needed and the viewing angle can be widened; therefore, further research thereon has been particularly carried out for practical use (for example, see Patent Document 1). Patent Document 1 is a report that polymer stabilization treatment is performed on liquid crystal to widen a temperature range in which a blue phase appears.

[Reference]

[Patent Document 1] PCT International Publication No. 05/090520

SUMMARY OF THE INVENTION

In order to achieve high contrast in a liquid crystal display device, white transmittance (light transmittance in white display) needs to be high. In the case of liquid crystal exhibiting a blue phase, degradation is caused by application of a high voltage; thus, in order to enable operation with a low driving voltage, it is necessary to apply an even electric field to reduce a load on a liquid crystal layer.

In view of the above situations, an object is to provide a liquid crystal display device a driving voltage of which is reduced and which has a more reliable liquid crystal layer exhibiting a blue phase. Further, an object is to provide a liquid crystal display device having a higher contrast and including a liquid crystal layer exhibiting a blue phase. Furthermore, an object is to provide a liquid crystal display device including a liquid crystal layer exhibiting a blue phase with the productivity and the yield increased and the manufacturing cost reduced.

Each of a pixel electrode layer and a common electrode layer which are formed over a first substrate (also referred to as an element substrate) and a second substrate (also referred to as a counter substrate) are firmly attached to each other by a sealant with a liquid crystal layer provided between the second substrate and the electrode layers. In a liquid crystal display device which includes a liquid crystal layer exhibiting a blue phase, a method in which the gray level is controlled by generation of an electric field generally parallel (i.e., in the lateral direction) to a substrate to move liquid crystal molecules in a plane parallel to the substrate can be used. In such a method, an electrode structure used in an in-plane switching (IPS) mode can be employed.

In a lateral electric field mode such as an IPS mode, a first electrode layer (e.g., a pixel electrode layer with which a voltage is controlled in each pixel) and a second electrode layer (e.g., a common electrode layer with which a common voltage is applied to all pixels), which have an opening pattern, are located below a liquid crystal layer. The first electrode layer and the second electrode layer have not plane shapes but various opening patterns including a bent portion or a branching comb-like portion. The first electrode layer and the second electrode layer do not overlap with each other but may have the same shape, in order to generate an electric field therebetween.

By applying an electric field between the pixel electrode layer and the common electrode layer, the liquid crystal molecules can be controlled. The liquid crystal molecules can be controlled in the direction parallel to the substrate, whereby a wide viewing angle is obtained.

A liquid crystal display device disclosed in this specification has the following structure. A first substrate (element substrate) provided with a first electrode layer and a second electrode layer and a second substrate (counter substrate) are firmly attached to each other by a sealant with a liquid crystal layer provided therebetween. A first wall-like structure body is provided over a first electrode layer (pixel electrode layer), a second wall-like structure body is provided over a second electrode layer (common electrode layer), and a dielectric film covers the first electrode layer and the first wall-like structure body provided over the first electrode layer, and the second electrode layer and the second wall-like structure body provided over the second electrode layer. The dielectric film is an insulating film having a higher dielectric constant than liquid crystal materials used for the first wall-like structure body, the second wall-like structure body, and the liquid crystal layer.

By providing, in a liquid crystal layer, a structure where a first wall-like structure body with a low dielectric constant is formed over a first electrode layer and a dielectric film with a high dielectric constant covers them, and a structure where a second wall-like structure body with a low dielectric constant is formed over a second electrode layer and a dielectric film with a high dielectric constant covers them, when a voltage is applied between the first electrode layer and the second electrode layer, an electric field can be generated more widely between the structure bodies.

In a liquid crystal layer exhibiting a blue phase, the alignment of liquid crystal molecules can be changed only in a local area in which an electric field is generated; however, when a structure body including a material with a low dielectric constant is covered with a dielectric film including a material with a high dielectric constant, an electric field can be generated more widely in the liquid crystal layer, so that the alignment of the liquid crystal molecules can be changed in the wide area where an electric field is generated. Thus, the white transmittance can be increased, which leads to higher contrast in a liquid crystal display device including the liquid crystal layer exhibiting a blue phase.

Further, the liquid crystal layer exhibiting a blue phase, which is likely to be influenced by local concentration of an electric field, can be driven with a load on the liquid crystal layer reduced; therefore, reliability of the liquid crystal layer exhibiting a blue phase can be increased and the driving voltage can be reduced.

The height of the structure body can be easily controlled; thus, the productivity and the yield can be increased and the manufacturing cost can be reduced.

Note that in the case where a coloring layer functioning as a color filter, a light-blocking layer functioning as a black matrix, an insulating layer, or the like is formed between the second substrate and the liquid crystal layer, the dielectric film and a layer which is on the second substrate and is in contact with the liquid crystal layer are in contact with each other.

The first wall-like structure body, the second wall-like structure body, and the dielectric film can each be formed using an insulator including an insulating material (an organic material and/or an inorganic material). Typically, a visible light curable resin, an ultraviolet curable resin, a thermosetting resin, or a thermoplastic resin is preferably used. For example, an acrylic resin, an epoxy resin, an amine resin, a pullulan derivative, or the like may be used. Alternatively, an organic-inorganic composite material of an inorganic material and an organic material may be used, and for example, an organic-inorganic composite material of barium titanate and an organic resin or the like can be used. The dielectric film is formed using a material having a higher dielectric constant than the first wall-like structure body, the second wall-like structure body, and a liquid crystal material used for the liquid crystal layer. A material with a dielectric constant of 12 or more is preferably used. Further, a material with a dielectric constant of 20 or more is particularly preferable.

Note that the first wall-like structure body and the second wall-like structure body may have a columnar shape, a conical or pyramidal shape with a plane top surface and a trapezoidal cross section, a conical or pyramidal shape with a rounded top surface, or the like. Note that the first wall-like structure body and the second wall-like structure body may reflect the shapes of the first electrode layer and the second electrode layer, respectively, to have shapes similar to the shapes thereof. In order to fill a space between the first substrate and the second substrate with the liquid crystal layer, the structure bodies are formed to have shapes by which an air gap is not formed in a pixel region. As for the shape of the dielectric film, there may be a difference between the thicknesses of the dielectric film. The distance between the first electrode layer and the second electrode layer is preferably 0.2 µm to 10 µm (more preferably, 0.2 µm to 2 µm), and typically, the distance is preferably 0.8 µm to 2 µm.

The thickness (cell gap) of the liquid crystal layer is preferably about 5 µm to 20 µm. The heights (thicknesses) of the first wall-like structure body and the second wall-like structure body are each preferably approximately greater than or equal to 1.0 µm and smaller than or equal to the thickness (cell gap) of the liquid crystal layer. Note that when the height (thickness) of the dielectric film is greater than or equal to 100 µm, an adequate effect can be achieved.

In the case where the dielectric film is provided in contact with the second substrate, the structure bodies and the dielectric film can function as spacers. In that case, the sum of the height of the first wall-like structure body and the height of the dielectric film covering the structure body (the sum of the thicknesses thereof) and the sum of the height of the second wall-like structure body and the height of the dielectric film covering the structure body (the sum of the thicknesses thereof) each roughly correspond to the thickness of the liquid crystal layer. The dielectric film may have a layered structure. In the case where the second substrate is provided with a first wall-like structure body, a second wall-like structure body, and a dielectric film, the first substrate and the second substrate may be attached to each other so that the dielectric films are in contact with each other to have a layered structure. Note that in the case where a coloring layer functioning as a color filter, a light-blocking layer functioning as a black matrix, an insulating layer, or the like is formed between the second substrate and the liquid crystal layer, the dielectric film and a film which is on the second substrate and is in contact with the liquid crystal layer are in contact with each other.

The first wall-like structure body covered with the dielectric film and the second wall-like structure body covered with the dielectric film may be selectively provided over the first electrode layer and the second electrode layer, respectively. For example, in the case where the first electrode layer and the second electrode layer have complicated shapes, the first wall-like structure body and the second wall-like structure body are selectively provided; thus, injection of the liquid crystal material and the filling with the liquid crystal material are facilitated, and process time can be shortened. Note that the dielectric film may cover the first electrode layer over which the first wall-like structure body is not provided and the second electrode layer over which the second wall-like structure body is not provided.

The first wall-like structure body and the second wall-like structure body can be formed in such a manner that an insulating film is formed so as to cover the first electrode layer and the second electrode layer, and the insulating film is selectively etched. In this etching step, the insulating film between the first electrode layer and the second electrode layer may partially remain instead of being removed completely (a remaining portion is also referred to as a third wall-like structure body). The dielectric film is formed using an insulating film covering surfaces of the first wall-like structure body over the first electrode layer and the second wall-like structure body over the second electrode layer, and the insulating film between the first electrode layer and the second electrode layer may be etched to be completely removed.

In this specification, the first electrode layer (pixel electrode layer) and the second electrode layer (common electrode layer) each have a comb-like pattern which does not have a closed space. The first electrode layer and the second electrode layer are not in contact with each other, and they are provided on the same insulating surface (e.g., the same substrate or the same insulating film) such that their comb-like patterns engage with each other.

In this specification, a substrate over which a thin film transistor, a first electrode layer (pixel electrode layer), a second electrode layer (common electrode layer), and an interlayer film are formed is referred to as an element substrate (first substrate), and a substrate which faces the element substrate with a liquid crystal layer provided therebetween is referred to as a counter substrate (second substrate).

A liquid crystal material exhibiting a blue phase is used for the liquid crystal layer. The liquid crystal material exhibiting a blue phase has a short response time of 1 msec or less and enables high-speed response, whereby higher performance of the liquid crystal display device can be achieved.

The liquid crystal material exhibiting a blue phase includes liquid crystal and a chiral agent. The chiral agent is employed to align the liquid crystal in a helical structure and to make the liquid crystal exhibit a blue phase. For example, a liquid crystal material into which a chiral agent is mixed at several weight percent or more may be used for the liquid crystal layer.

As the liquid crystal, thermotropic liquid crystal, low-molecular liquid crystal, high-molecular liquid crystal, ferroelectric liquid crystal, anti-ferroelectric liquid crystal, or the like is used.

As the chiral agent, a material having high compatibility with liquid crystal and strong twisting power is used. Either an R-enantiomer or an S-enantiomer is used, and a racemic mixture in which an R-enantiomer and an S-enantiomer are mixed at 50:50 is not used.

The above liquid crystal material exhibits a cholesteric phase, a cholesteric blue phase, a smectic phase, a smectic blue phase, a cubic phase, a chiral nematic phase, an isotropic phase, or the like depending on a condition.

A cholesteric blue phase and a smectic blue phase, which are blue phases, are seen in a liquid crystal material having a cholesteric phase or a smectic phase with a relatively short helical pitch of less than or equal to 500 nm. The alignment of the liquid crystal material has a double twist structure. An optical modulation action occurs through a change in alignment by voltage application. A blue phase is optically isotropic and thus has no viewing angle dependence. That is why an alignment film is not necessarily formed; therefore, display image quality can be improved and the cost can be reduced.

The blue phase appears only within a narrow temperature range; therefore, it is preferable that a photocurable resin and a photopolymerization initiator be added to a liquid crystal material and polymer stabilization treatment be performed in order to widen the temperature range. The polymer stabilization treatment is performed in such a manner that a liquid crystal material including liquid crystal, a chiral agent, a photocurable resin, and a photopolymerization initiator is irradiated with light having a wavelength with which the photocurable resin and the photopolymerization initiator react. This polymer stabilization treatment may be performed by irradiating a liquid crystal material exhibiting an isotropic phase with light or by irradiating a liquid crystal material exhibiting a blue phase under the control of the temperature with light.

According to one embodiment of a structure of the invention disclosed in this specification, included are a first substrate and a second substrate between which a liquid crystal layer including a liquid crystal material exhibiting a blue phase is sandwiched, a first electrode layer and a second electrode layer which are formed over the first substrate and have opening patterns, a first wall-like structure body provided over the first electrode layer, a second wall-like structure body provided over the second electrode layer, and a dielectric film covering the first wall-like structure body and the second wall-like structure body. The dielectric constant of the dielectric film is higher than those of the first wall-like structure body, the second wall-like structure body, and the liquid crystal layer.

According to one embodiment of a structure of the invention disclosed in this specification, included are a first substrate and a second substrate between which a liquid crystal layer including a liquid crystal material exhibiting a blue phase is sandwiched, a first electrode layer and a second electrode layer which are formed over the first substrate and have opening patterns, a first wall-like structure body provided over the first electrode layer, a second wall-like structure body provided over the second electrode layer, and a dielectric film covering the first wall-like structure body and the second wall-like structure body. The dielectric film covering the first electrode layer, the second electrode layer, the first wall-like structure body, and the second wall-like structure body is in contact with the second substrate. The dielectric constant of the dielectric film is higher than those of the first wall-like structure body, the second wall-like structure body, and the liquid crystal layer.

Since the liquid crystal layer exhibiting a blue phase is used, it is not necessary to form an alignment film. Thus, a pixel electrode layer (first electrode layer) is in contact with the liquid crystal layer, and a common electrode layer (second electrode layer) is also in contact with the liquid crystal layer.

Note that the ordinal numbers such as "first", "second", and "third" are used for convenience and do not denote the order of steps and the stacking order of layers. In addition, the ordinal numbers in this specification do not denote particular names which specify the present invention.

In this specification, a semiconductor device means every device which can function by utilizing semiconductor characteristics, and an electrooptic device, a semiconductor circuit, and an electronic device are all semiconductor devices.

In a liquid crystal display device including a liquid crystal layer exhibiting a blue phase, a driving voltage can be reduced and reliability of the liquid crystal layer exhibiting a blue phase can be increased. Further, the productivity and the yield of the liquid crystal display device including the liquid crystal layer exhibiting a blue phase can be increased and the manufacturing cost can be reduced. Furthermore, the contrast ratio of the liquid crystal display device including the liquid crystal layer exhibiting a blue phase can be increased.

BRIEF DESCRIPTION OF THE DRAWINGS

In the accompanying drawings:

FIGS. 12A1, 12A2, and 12B each illustrate a liquid crystal display device.

DETAILED DESCRIPTION OF THE INVENTION

Figure 1A:
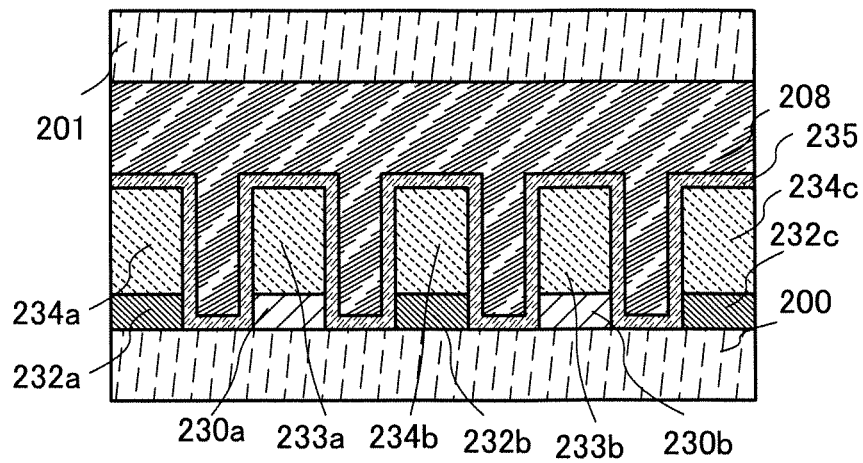
FIGS. 1A to 1C illustrate a liquid crystal display device.

Embodiments will be described with reference to drawings. Note that the present invention is not limited to the following description, and it will be easily understood by those skilled in the art that the modes and details of the present invention can be modified in various ways without departing from the spirit and scope of the disclosed invention. Therefore, the disclosed invention should not be construed as being limited to the following description of the embodiments. In the structures to be described below, the same portions or portions having similar functions are denoted by the same reference numerals in different drawings, and explanation thereof will not be repeated.

(Embodiment 1)

Liquid crystal display devices will be described with reference to FIGS. 1A to 1C to FIGS. 9A to 9C.

FIGS. 1A to 1C, FIGS. 2A and 2B, and FIGS. 4A to 4C are cross-sectional views of the liquid crystal display devices.

FIG. 1A illustrates a liquid crystal display device in which a first substrate 200 and a second substrate 201 are arranged so as to face each other with a liquid crystal layer 208, which includes a liquid crystal material exhibiting a blue phase, provided therebetween. Between the first substrate 200 and the liquid crystal layer 208, first electrode layers 230a and 230b which are pixel electrode layers and with which a voltage is controlled for each pixel, first wall-like structure bodies 233a and 233b, second electrode layers 232a, 232b, and 232c which are common electrode layers and with which a common voltage is applied to all pixels, second wall-like structure bodies 234a, 234b, and 234c, and a dielectric film 235 covering them are provided. A structure where the first wall-like structure bodies 233a and 233b are formed over the first electrode layers 230a and 230b, respectively, and the dielectric film 235 covers them and a structure where the second wall-like structure bodies 234a, 234b, and 234c are formed over the second electrode layers 232a, 232b, and 232c, respectively, and the dielectric film 235 covers them are provided in the liquid crystal layer 208.

Figure 1B:
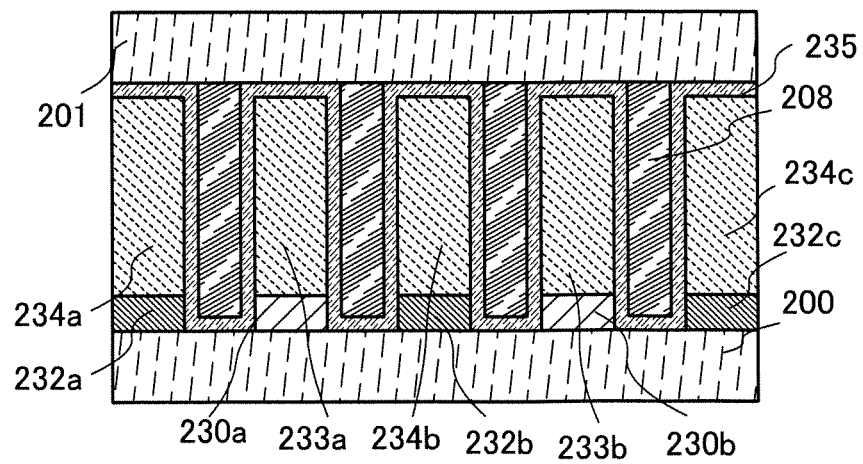
Figure 1C:
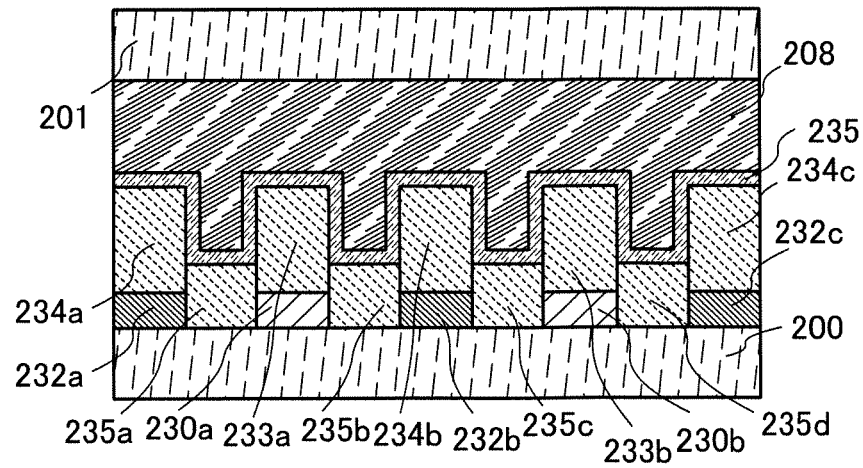

The first electrode layers 230a and 230b and the second electrode layers 232a, 232b, and 232c do not have plane-like shapes but have shapes with opening patterns; therefore, the first electrode layers 230a and 230b and the second electrode layers 232a, 232b, and 232c are illustrated as a plurality of divided electrode layers in the cross-sectional views of FIGS. 1A to 1C.

In a liquid crystal display device which includes the liquid crystal layer 208 exhibiting a blue phase, an electrode structure used in an IPS mode can be applied.

In a lateral electric field mode such as an IPS mode, the first electrode layers 230a and 230b and the second electrode layers 232a, 232b, and 232c, which have opening patterns, are located below the liquid crystal layer 208. The first electrode layers 230a and 230b and the second electrode layers 232a, 232b, and 232c do not have plane shapes but have various opening patterns including a bent portion or a branching comb-like portion. The first electrode layers 230a and 230b and the second electrode layers 232a, 232b, and 232c do not overlap with each other but may have the same shape, in order to generate an electric field between the electrode layers.

The first electrode layers 230a and 230b and the second electrode layers 232a, 2326, and 232c have comb-like patterns which do not form closed spaces. The first electrode layers 230a and 230b and the second electrode layers 232a, 232b, and 232c are not in contact with each other, and are provided on the same insulating surface (e.g., the same substrate or the same insulating film) such that the teeth of their comb-like patterns are engaged with each other.

By application of an electric field between the first electrode layer 230a and the second electrode layer 232a, between the first electrode layer 230a and the second electrode layer 232b, between the first electrode layer 230b and the second electrode layer 232b, and between the first electrode layer 230b and the second electrode layer 232c, liquid crystal molecules can be controlled. The liquid crystal molecules can be controlled in the direction parallel to the first substrate 200 and the second substrate 201; therefore, the viewing angle can be widened.

The dielectric film 235 is an insulator having a higher dielectric constant than the first wall-like structure bodies 233a and 233b, the second wall-like structure bodies 234a, 234b, and 234c, and the liquid crystal layer 208. Note that the first wall-like structure bodies 233a and 233b and the second wall-like structure bodies 234a, 234b, and 234c may be insulators each having a lower dielectric constant than the liquid crystal material used for the liquid crystal layer 208.

By providing, in the liquid crystal layer 208, a structure where the first wall-like structure bodies 233a and 233b with a low dielectric constant are formed over the first electrode layers 230a and 230b, respectively, and the dielectric film 235 with a high dielectric constant covers them and a structure where the second wall-like structure bodies 234a, 234b, and 234c with a low dielectric constant are formed over the second electrode layers 232a, 232b, and 232c, respectively, and the dielectric film 235 with a high dielectric constant covers them, an electric field can be generated more widely between the structure bodies when a voltage is applied between the first electrode layer 230a and the second electrode layer 232a, between the first electrode layer 230a and the second electrode layer 232b, between the first electrode layer 230b and the second electrode layer 232b, and between the first electrode layer 230b and the second electrode layer 232c.

In the case where the dielectric film is formed using a material with a high dielectric constant, it may be difficult to form the dielectric film to have a high height (large thickness). However, the first wall-like structure bodies 233a and 233b and the second wall-like structure bodies 234a, 234b, and 234c are formed with the use of a material having a lower dielectric constant so that they have desired heights and the structure bodies are covered with the dielectric film 235 formed with a higher dielectric constant as in the present invention, whereby the height of the dielectric film can be increased to the extent that is difficult to realize only with a material having a high dielectric constant. Even if the height (thickness) of the dielectric film 235 covering them is low (small), an effect close to that obtained when the structure bodies are formed only with a material having a high dielectric constant can be achieved.

In the liquid crystal layer 208 exhibiting a blue phase, the alignment of liquid crystal molecules can be changed only in the local area where an electric field is generated. However, when the structure bodies formed with a material having a low dielectric constant are covered with the dielectric film having a high dielectric constant, an electric field can be generated more widely in the liquid crystal layer 208, so that the alignment of the liquid crystal molecules can be changed in the wide area where the electric field is generated. Thus, the white transmittance can be increased, which leads to higher contrast in the liquid crystal display device including the liquid crystal layer exhibiting a blue phase.

Further, the liquid crystal layer exhibiting a blue phase, which is likely to be influenced by local concentration of an electric field, can be driven with a load on the liquid crystal layer reduced; therefore, reliability of the liquid crystal layer exhibiting a blue phase can be increased and the driving voltage can be reduced.

The heights of the structure bodies can be easily controlled; thus, the productivity and the yield can be increased and the manufacturing cost can be reduced.

Further, the first wall-like structure bodies 233a and 233b with a low dielectric constant are formed over the first electrode layers 230a and 230b, respectively, and they are covered with the dielectric film 235 with a high dielectric constant, and similarly, the second wall-like structure bodies 234a, 234b, and 234c with a low dielectric constant are formed over the second electrode layers 232a, 232b, and 232c, respectively, and they are also covered with the dielectric film 235 with a high dielectric constant. Thus, lines of electric force from the first electrode layers 230a and 230b into the second electrode layers 232a, 232b, and 232c can be refracted at the interfaces between the dielectric film 235 having a higher dielectric constant and the first wall-like structure bodies 233a and 233b with a low dielectric constant and the second wall-like structure bodies 234a, 234b, and 234c with a low dielectric constant.

Figure 2A:
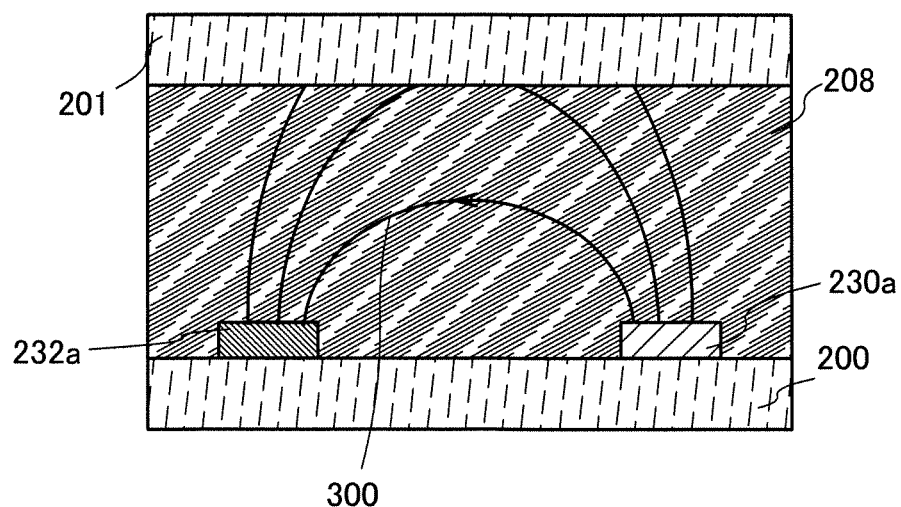
FIGS. 2A and 2B illustrate a liquid crystal display device.
Figure 2B:
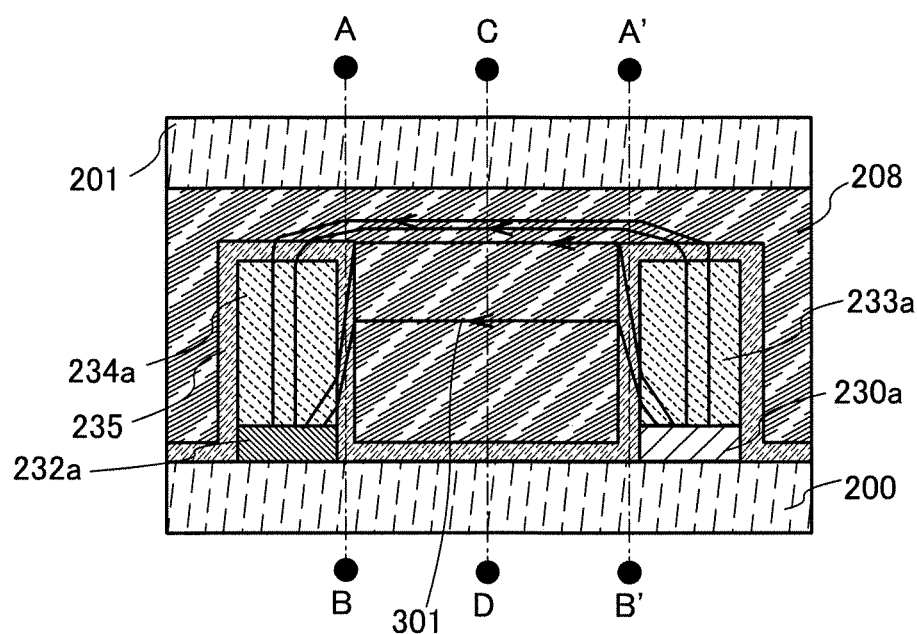

FIG. 2A illustrates lines of electric force 300 generated when a voltage is applied between the first electrode layer 230a and the second electrode layer 232a, and FIG. 2B illustrates lines of electric force 301 generated when a voltage is applied between the first electrode layer 230a and the second electrode layer 232a in the case where a structure where the first wall-like structure body 233a with a low dielectric constant is formed over the first electrode layer 230a and the dielectric film 235 with a high dielectric constant covers them and a structure where the second wall-like structure body 234a with a low dielectric constant is formed over the second electrode layer 232a and the dielectric film 235 with a high dielectric constant covers them are provided in the liquid crystal layer 208.

As illustrated in FIG. 2A, the lines of electric force 300 from the first electrode layer 230a into the second electrode layer 232a arch.

As illustrated in FIG. 2B, the lines of electric force 301 from the first electrode layer 230a into the second electrode layer 232a are refracted at the interface between the first wall-like structure body 233a with a low dielectric constant and the dielectric film 235 with a high dielectric constant and at the interface between the dielectric film 235 with a high dielectric constant and the second wall-like structure body 234a with a low dielectric constant, and is extended in the direction perpendicular to the substrate, in the dielectric film 235. Further, the strength of an electric field (the density of the lines of electric force) in the dielectric film 235 with a high dielectric constant is lower than that in the first wall-like structure body 233a with a low dielectric constant and that in the second wall-like structure body 234a with a low dielectric constant. Thus, a change in potential in the dielectric film 235 is small and the potential difference between A and B and the potential difference between A' and B' are small, which suppresses variation in electric field applied to a region sandwiched between the structure bodies. Further, since the dielectric constant of the dielectric film 235 is higher than that of the liquid crystal layer 208, the lines of electric force 301 are refracted in the direction parallel to the substrate at the interface between the liquid crystal layer 208 and the dielectric film 235, and thus have flatter arch shape than the lines of electric force 300.

The lines of electric force 301 in the liquid crystal layer 208 have flatter arch shapes, so that the density of the lines of electric force 301 is increased in the region between the structure bodies and the lines of electric force 301 can be effectively converged. Thus, a higher electric field can be generated. Moreover, the proportion of a horizontal component of the lines of electric force 301 is increased in the vicinity of the first electrode layer 230a and the second electrode layer 232a; therefore, reduced is a difference between the strength of an electric field which acts in the vicinity of the first electrode layer 230a and the second electrode layer 232a and the strength of an electric field which acts in the vicinity of a central line C-D between the first electrode layer 230a and the second electrode layer 232a. Since variation in electric field decreases, a more even electric field can be generated.

Therefore, in FIG. 2B. an even and strong electric field can be generated between the dielectric film 235 covering the first electrode layer 230a and the first wall-like structure body 233a and the dielectric film 235 covering the second electrode layer 232a and the second wall-like structure body 234a when a voltage is applied between the first electrode layer 230a and the second electrode layer 232a, as compared to the case of FIG. 2A.

As illustrated in FIG. 1B, the dielectric film 235 may be provided in contact with the second substrate 201 facing the first substrate 200. As in the liquid crystal display device of FIG. 1B, the dielectric film 235 covering the first electrode layers 230a and 230b, the first wall-like structure bodies 233a and 233b, the second electrode layers 232a, 232b, and 232c, and the second wall-like structure bodies 234a, 234b, and 234c is provided in contact with the second substrate 201 facing the first substrate 200, whereby an electric field can be generated in the whole liquid crystal layer 208. The dielectric film 235 is preferably formed using a material having a higher dielectric constant. When a material preferably having a dielectric constant of 12 or more or more preferably having a dielectric constant of 20 or more is used, a more even and stronger electric field can be generated between the structure bodies. Note that the first wall-like structure bodies 233a and 233b and the second wall-like structure bodies 234a, 234b, and 234c may be insulators whose dielectric constant is lower than that of the liquid crystal layer 208 exhibiting a blue phase.

When a strong electric field can be generated more evenly in the liquid crystal layer 208 exhibiting a blue phase, a driving voltage of the liquid crystal display device can be reduced. Further, a load is not easily applied to the liquid crystal layer 208 exhibiting a blue phase which is likely to be influenced by local concentration of an electric field, so that the liquid crystal layer 208 exhibiting a blue phase can have higher reliability.

When the alignment of the liquid crystal molecules in the liquid crystal layer 208 exhibiting a blue phase can be changed in a wider area, white transmittance can be increased and thus contrast in the liquid crystal display device including the liquid crystal layer 208 exhibiting a blue phase can be improved.

The heights of the structure bodies can be easily controlled, so that the productivity and the yield can be increased and the manufacturing cost can be reduced.

The first wall-like structure bodies 233a and 233b, the second wall-like structure bodies 234a, 234b, and 234c, and the dielectric film 235 can be formed using an insulator including an insulating material (an organic material and/or an inorganic material). Typically, a visible light curable resin, an ultraviolet curable resin, a thermosetting resin, or a thermoplastic resin is preferably used. For example, an acrylic resin, an epoxy resin, an amine resin, a pullulan derivative, or the like may be used. Alternatively, an organic material such as a titanium oxide or an organic-inorganic composite material of an inorganic material and an organic material may be used, and for example, an organic-inorganic composite material of barium titanate and an organic resin or the like can be used. The dielectric film 235 is formed using a material having a higher dielectric constant than materials used for the first wall-like structure bodies 233a and 233b and the second wall-like structure bodies 234a, 234b, and 234c, and the liquid crystal material used for the liquid crystal layer 208. A material with a dielectric constant of 12 or more is preferably used. Further, a material with a dielectric constant of 20 or more is particularly preferable. Note that the first wall-like structure bodies 233a and 233b and the second wall-like structure bodies 234a, 234b, and 234c may be formed using a material having a lower dielectric constant than the liquid crystal material used for the liquid crystal layer 208.

Note that the first wall-like structure bodies 233a and 233b and the second wall-like structure bodies 234a, 234b, and 234c may each have a columnar shape, a conical or pyramidal shape with a plane top surface and a trapezoidal cross section, a conical or pyramidal shape with a rounded top surface, or the like. Note that the first wall-like structure bodies 233a and 233b and the second wall-like structure bodies 234a, 234b, and 234c may reflect the shapes of the first electrode layers 230a and 230b and the second electrode layers 232a, 232b, and 232c, respectively, to have shapes similar to the shapes thereof. In order to fill a space between the first substrate and the second substrate with the liquid crystal layer 208, the structure bodies are formed to have shapes by which an air gap is not formed in a pixel region. As for the shape of the dielectric film 235, there may be variation in thickness of the dielectric film 235 (see FIGS. 9A to 9C). The distances between the first electrode layer 230a and the second electrode layer 232a, between the first electrode layer 230a and the second electrode layer 232b, between the first electrode layer 230b and the second electrode layer 232b, and between the first electrode layer 230b and the second electrode layer 232c are each preferably 0.2 µm to 10 µm (more preferably, 0.2 µm to 2 µm), and typically, the distance is preferably 0.8 µm to 2 µm.

The thickness (cell gap) of the liquid crystal layer 208 is preferably about 5 µm to 20 µm. The heights (thicknesses) of the first wall-like structure bodies 233a and 233b and the second wall-like structure bodies 234a, 234b, and 234c are each preferably approximately greater than or equal to 1.0 µm and smaller than or equal to the thickness (cell gap) of the liquid crystal layer. Note that when the height (thickness) of the dielectric film is greater than 100 nm, an adequate effect can be achieved.

As in FIG. 1B, in the case where the dielectric film 235 covering the first electrode layers 230a and 230b, the first wall-like structure bodies 233a and 233b, the second electrode layers 232a, 232b, and 232c and the second wall-like structure bodies 234a, 234b, and 234c is provided in contact with the second substrate 201 facing the first substrate 200, the structure bodies and the dielectric film can function as spacers. In that case, the sum of the heights (thicknesses) of the first wall-like structure body 233a and the dielectric film 235 covering the structure body, the sum of the heights (thicknesses) of the first wall-like structure body 233b and the dielectric film 235 covering the structure body, the sum of the heights (thicknesses) of the second wall-like structure body 234a and the dielectric film 235 covering the structure body, the sum of the heights (thicknesses) of the second wall-like structure body 234b and the dielectric film 235 covering the structure body, and the sum of the heights (thicknesses) of the second wall-like structure body 234c and the dielectric film 235 covering the structure body each roughly correspond to the thickness of the liquid crystal layer 208 (a so-called cell thickness). Owing to such a structure, an effect close to that obtained from the structure where structure bodies are formed using only a material with a high dielectric constant can be achieved.

Figure 4A:
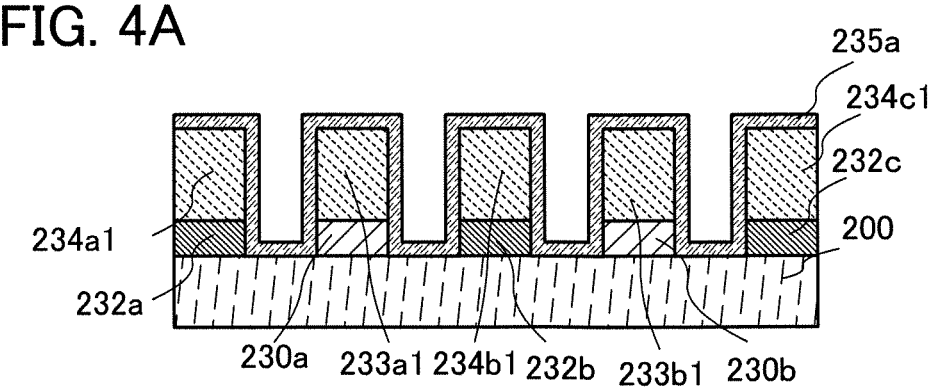
FIGS. 4A to 4C illustrate a liquid crystal display device.
Figure 4B:
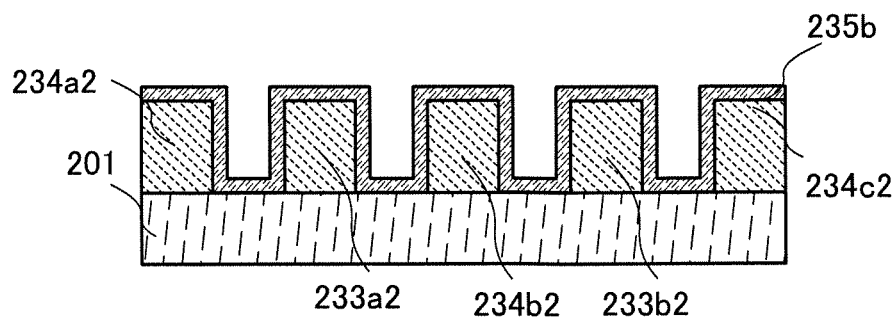
Figure 4C:
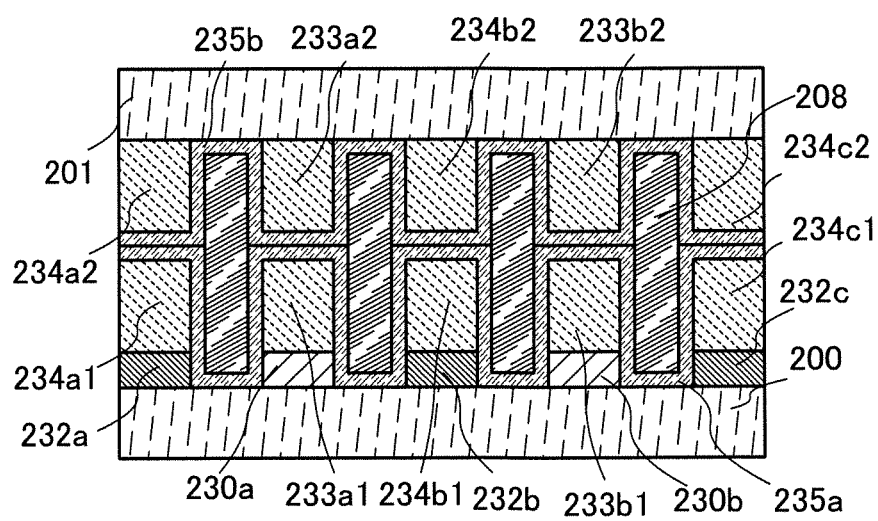

For example, as illustrated in FIGS. 4A to 4C, over the first substrate 200, first wall-like structure bodies 233a1 and 233b1 are formed over the first electrode layers 230a and 230b, respectively, and they are covered with a dielectric film 235a, and similarly, second wall-like structure bodies 234a1, 234b1, and 234c1 are formed over the second electrode layers 232a, 232b, and 232c, respectively, and they are covered with the dielectric film 235a (see FIG. 4A).

On the other hand, over the second substrate 201, first wall-like structure bodies 233a2 and 233b2 are formed at positions corresponding to the first wall-like structure bodies 233a1 and 233b1 (positions overlapping with the first wall-like structure bodies 233a1 and 233b1 with the dielectric film 235b interposed therebetween when the first substrate 200 and the second substrate 201 face each other) and similarly, second wall-like structure bodies 234a2, 234b2, and 234c2 are formed at positions corresponding to the second wall-like structure bodies 234a1, 234b1, and 234c1 (positions overlapping with the second wall-like structure bodies 234a1, 234b1, and 234c1 with the dielectric film 235b interposed therebetween when the first substrate 200 and the second substrate 201 face each other). The dielectric film 235b is formed so as to cover the first wall-like structure bodies 233a2 and 233b2 and the second wall-like structure bodies 234a2, 234b2, and 234c2 (see FIG. 4B).

The first substrate 200 and the second substrate 201 are provided so that they face each other, the first wall-like structure bodies 233a1 and 233b1 overlap with the first wall-like structure bodies 233a2 and 233b2, respectively; the second wall-like structure bodies 234a1, 234b1, and 234c1 overlap the second wall-like structure bodies 234a2, 234b2, and 234c2, respectively; and the dielectric film 235a and the dielectric film 235b are in contact with each other. The following stacks can be formed: a stack of the dielectric film 235a covering the first wall-like structure body 233a1 and the dielectric film 235b covering the first wall-like structure body 233a2; a stack of the dielectric film 235a covering the first wall-like structure body 233b1 and the dielectric film 235b covering the first wall-like structure body 233b2; a stack of the dielectric film 235a covering the second wall-like structure body 234a1 and the dielectric film 235b covering the second wall-like structure body 234a2; a stack of the dielectric film 235a covering the second wall-like structure body 234b1 and the dielectric film 235b covering the second wall-like structure body 234b2; and a stack of the dielectric film 235a covering the second wall-like structure body 234c1 and the dielectric film 235b covering the second wall-like structure body 234c2 (see FIG. 4C).

Figure 5A:
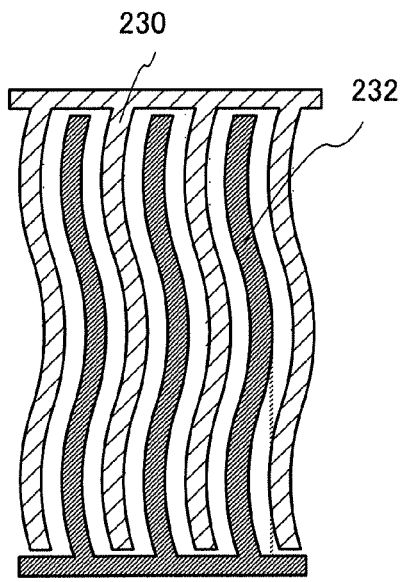
FIGS. 5A to 5D illustrate a liquid crystal display device.
Figure 5B:
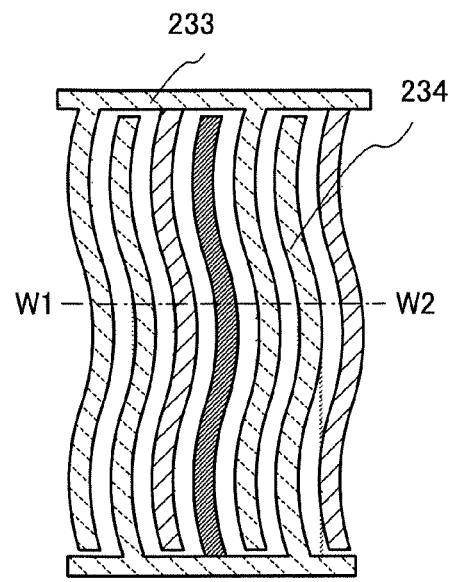
Figure 5C:
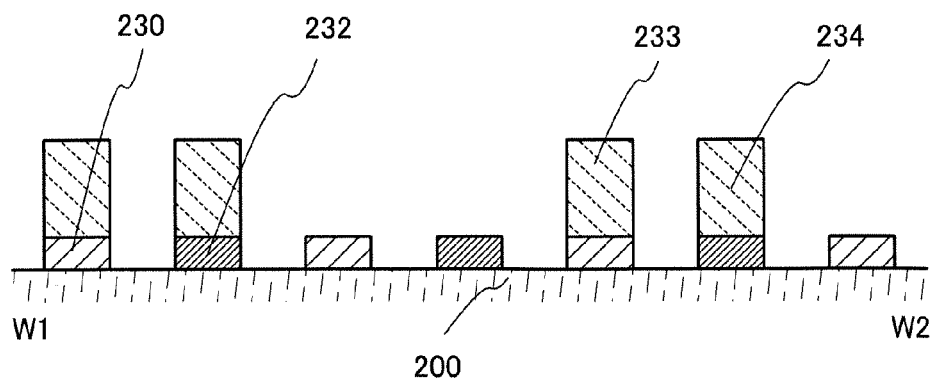
Figure 5D:
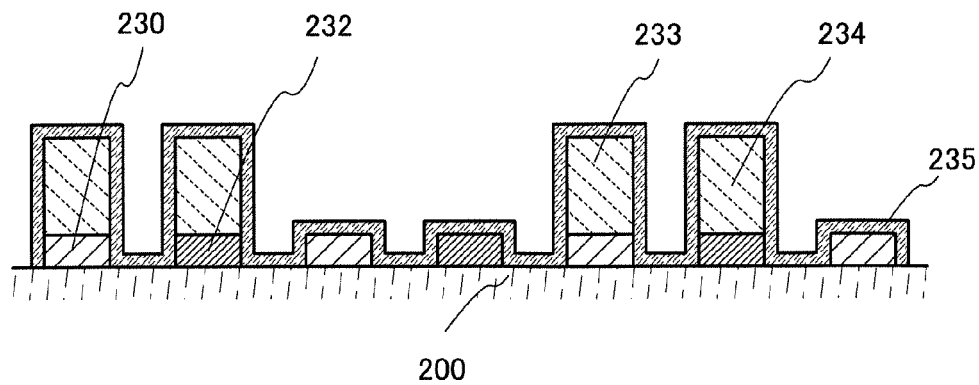

As illustrated in FIGS. 5A to 5D, the first wall-like structure body 233 and the second wall-like structure body 234 may be selectively formed over the first electrode layer 230 and the second electrode layer 232, respectively. FIG. 5A is a plan view of the first electrode layer 230 and the second electrode layer 232. The first electrode layer 230 and the second electrode layer 232 are comb-like electrode layers and are provided such that the teeth of their comb-like patterns are engaged with each other. FIG. 5B is a plan view in which the first wall-like structure body 233 is selectively formed over the first electrode layer 230 and the second wall-like structure body 234 is selectively formed over the second electrode layer 232. FIG. 5C is a cross-sectional view along W1-W2 in FIG. 5B. FIG. 5D is a cross-sectional view in which the dielectric film 235 covers the first electrode layer 230, the second electrode layer 232, the first wall-like structure body 233 formed selectively, and the second wall-like structure body 233 formed selectively, which are in FIG. 5C. In the case where the first electrode layer 230 and the second electrode layer 232 have complicated shapes, the first wall-like structure body 233 and the second wall-like structure body 234 are selectively provided; thus, injection of a liquid crystal material and filling with the liquid crystal material are facilitated, and process time can be shortened. Note that the first electrode layer 230 over which the first wall-like structure body 233 is not provided and the second electrode layer 232 over which the second wall-like structure body 234 is not provided may be covered with the dielectric film 235. An insulating film between the first electrode layer 230 and the second electrode layer 232 may partially remain as the dielectric film 235 instead of being removed completely.

As a method for forming the liquid crystal layer 208, a dispenser method (dropping method) or an injecting method by which liquid crystal is injected using a capillary phenomenon after the first substrate 200 and the second substrate 201 are bonded to each other can be used.

Figure 6A:
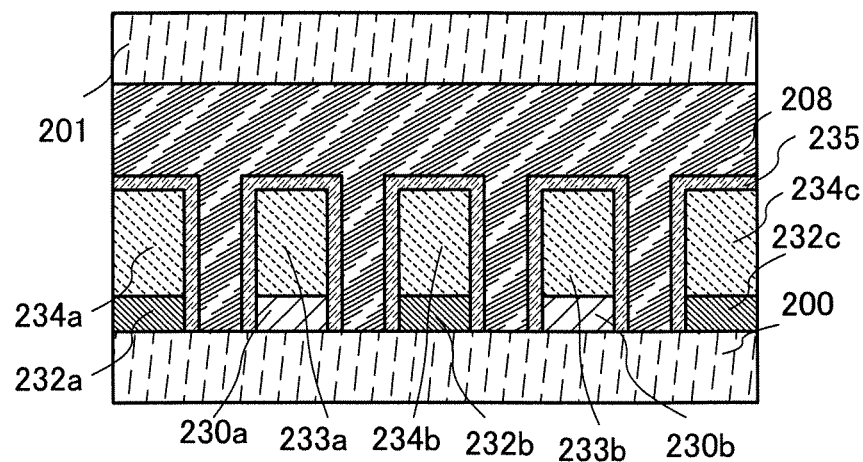
FIGS. 6A and 6B illustrate a liquid crystal display device.
Figure 6B:
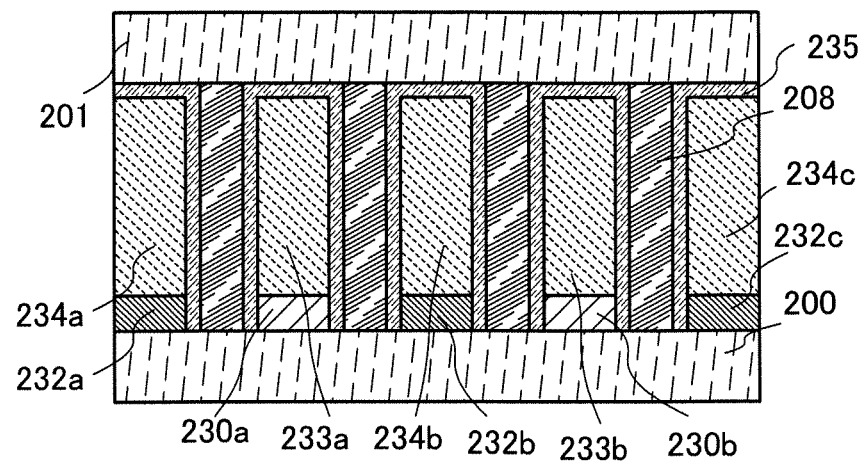

The first wall-like structure body and the second wall-like structure body can be formed in such a manner that an insulating film is formed so as to cover the first electrode layer and the second electrode layer, and the insulating film is selectively etched. In this etching step, as in the liquid crystal display device of FIG. 1C, the insulating film between the first electrode layer 230a and the second electrode layer 232a, between the first electrode layer 230a and the second electrode layer 232b, between the first electrode layer 230b and the second electrode layer 232b, and between the first electrode layer 230b and the second electrode layer 232c may partially remain as third wall-like structure bodies 235a, 235b, 235c, and 235d instead of being removed completely. As in the liquid crystal display devices in FIGS. 6A and 6B, the dielectric film 235 is formed using an insulating film so as to cover surfaces of the first wall-like structure bodies 233a and 233b provided over the first electrode layers 230a and 230b, respectively, and surfaces of the second wall-like structure bodies 234a, 234b, and 234c provided over the second electrode layers 232a, 232b, and 232c, respectively. The insulating film between the first electrode layers 230a and the second electrode layer 232a, between the first electrode layers 230a and the second electrode layer 232b, between the first electrode layers 230b and the second electrode layer 232b, and between the first electrode layers 230b and the second electrode layer 232c are etched to be completely removed.

Figure 7A:
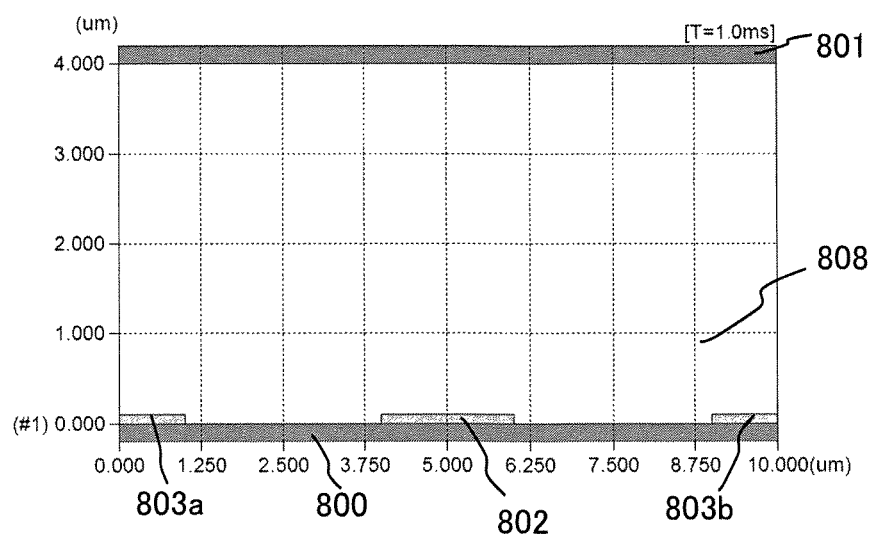
FIGS. 7A and 7B are graphs each showing calculation results of an electric field mode of a liquid crystal display device.
Figure 7B:
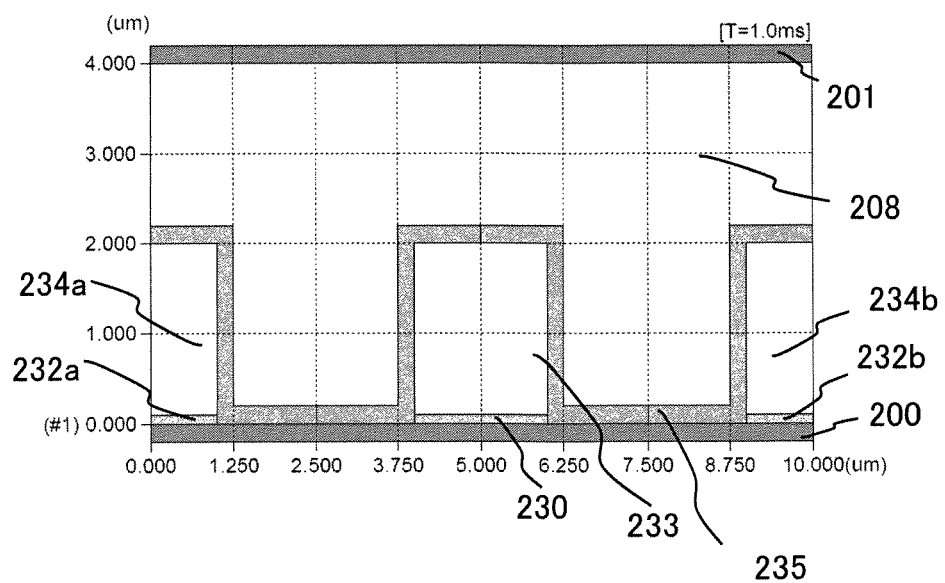
Figure 8A:
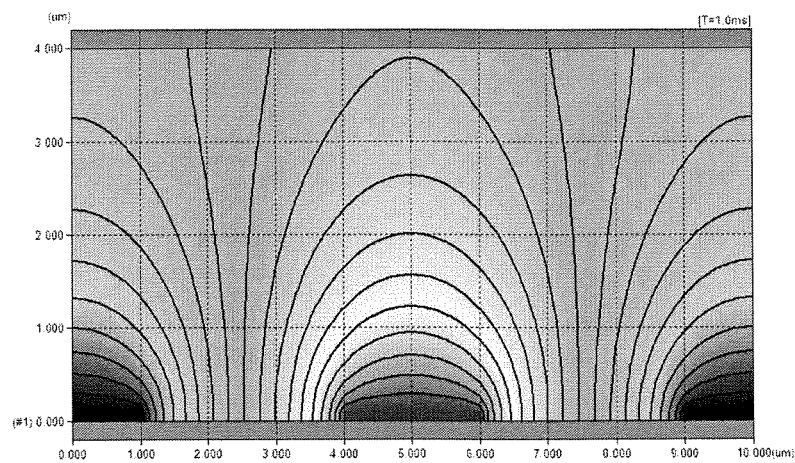
FIGS. 8A and 8B are graphs each showing calculation results of an electric field mode of the liquid crystal display device.
Figure 8B:
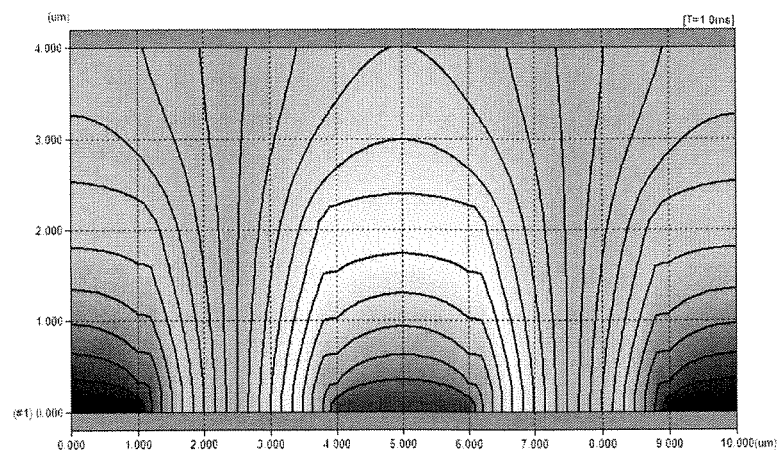
Figure 9A:
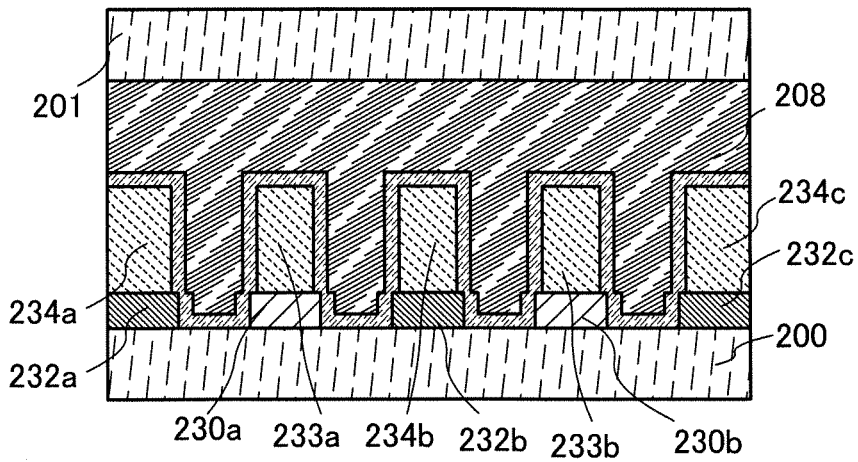
FIGS. 9A to 9C illustrate a liquid crystal display device.
Figure 9B:
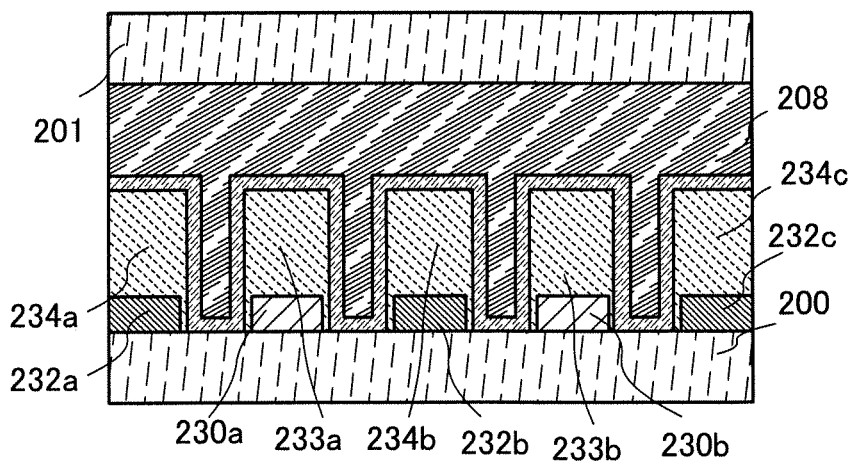
Figure 9C:
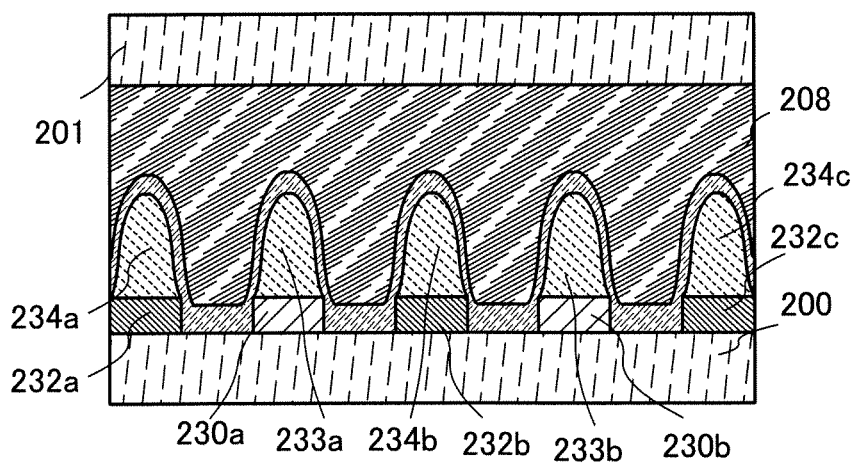

FIGS. 8A and 8B show results obtained by calculation of states where electric fields are applied in the liquid crystal display devices having the structures of FIGS. 7A and 7B. FIGS. 7A and 7B each illustrate a structure of a liquid crystal display device used for calculation. FIGS. 8A and 8B correspond to the structures of the liquid crystal display devices of FIGS. 7A and 7B, respectively. The calculation was performed using LCD Master, 2s Bench manufactured by SHINTECH, Inc.

In the liquid crystal display device of FIGS. 7A and 8A, a structure body is not provided, and between a first substrate 800 and a liquid crystal layer 808, a first electrode layer 802 and second electrode layers 803a and 803b are alternately formed, and the liquid crystal display device is sealed with a second substrate 801. In a cross section, the widths of the first electrode layer 802 and the second electrode layers 803a and 803b are each 2 μm, and the thicknesses thereof are each 0.1 μm; the thickness of the liquid crystal layer is 4 μm; and the distance between the following in the direction parallel to the substrate are each 3 μm: between the first electrode layer 802 and the second electrode layer 803a, and between the first electrode layer 802 and the second electrode layer 803b. Note that the voltage applied to the second electrode layers 803a and 803b is set to 0 V, and the voltage applied to the first electrode layer 802 is set to 10 V. As for the dielectric constant of the liquid crystal layer, a dielectric constant $\epsilon$ of the liquid crystal layer in the direction parallel to the major axis of the liquid crystal molecule is 8.3, and that in the direction perpendicular to the major axis of the liquid crystal molecule is 3.1.

In the liquid crystal display device of FIG. 7B and FIG. 8B, between the first substrate 200 and the liquid crystal layer 208, a first electrode layer 230 and second electrode layers 232a and 232b are alternately formed, a structure where the first wall-like structure body 233 is formed over the first electrode layer 230 and they are covered with the dielectric film 235 and a structure where the second wall-like structure bodies 234a and 234b are formed over the second electrode layers 232a and 232b, respectively, and they are covered with the dielectric film 235 are provided, and the liquid crystal display device is sealed with the second substrate 201. An insulator with a dielectric constant of 4 was used for the first wall-like structure body 233 and the second wall-like structure bodies 234a and 234b, and an insulator with a dielectric constant of 30 was used for the dielectric film 235. Moreover, in a cross section, the widths of the first electrode layer 230 and the second electrode layers 232a and 232b are each 2 μm, and the thicknesses thereof are each 0.1 μm; the widths of the first wall-like structure body 233 and the second wall-like structure bodies 234a and 234b are each 2 μm, and the thicknesses thereof are each 1.9 μm; the thickness of the dielectric film 235 is 0.2 μm; the thickness of the liquid crystal layer is 4 μm; the distance between the first electrode layer 230 and the second electrode layer 232a is 3 μm; and the distance between the first electrode layer 230 and the second electrode layer 232b is 3 μm. Note that the voltage applied to the second electrode layers 232a and 232b is set to 0 V, and the voltage applied to the first electrode layer 230 is set to 10 V. As for the dielectric constant of the liquid crystal layer, a dielectric constant $\epsilon$ of the liquid crystal layer in the direction parallel to the major axis of the liquid crystal molecule is 8.3, and that in the direction perpendicular to the major axis of the liquid crystal molecule is 3.1.

In FIG. 8A, solid lines show equipotential lines, and the first electrode layer and the second electrode layer are arranged over the first substrate 800. In FIG. 8B, solid lines show equipotential lines, and the first electrode layer and the second electrode layer are arranged over the first substrate 200.

An electric field is generated perpendicularly to the equipotential lines; thus, it can be confirmed that an electric field is applied in the lateral direction between the first electrode layer 802 and the second electrode layers 803a and 803b as shown in FIG. 8A, and an electric field is applied in the lateral direction between the dielectric film 235 covering the first electrode layer 230 and the first wall-like structure body 233 formed thereover, and the dielectric film 235 covering the second electrode layers 232a and 232b and the second wall-like structure bodies 234a and 234b formed thereover as shown in FIG. 8B.

As shown in FIG. 8A, equipotential lines are shown in the liquid crystal layer 808 in the proximity of the first substrate 800 over which the first electrode layer 802 and the second electrode layers 803a and 803b are formed; however, equipotential lines are sparsely distributed as the equipotential lines get closer to the second substrate 801. Further, an equipotential line is not shown in the liquid crystal layer 808 in the proximity of the second substrate 801, and it can be confirmed that it is difficult to make all liquid crystal molecules in the liquid crystal layer respond when the structure in FIG. 7A is employed.

On the other hand, as shown in FIG. 8B, in the structure where the dielectric film 235 covers the first electrode layer 230, the first wall-like structure body 233, the second electrode layers 232*a* and 232*b*, and the second wall-like structure bodies 234*a* and 234*b*, equipotential lines have flatter arch shapes and the proportion of a horizontal component increases. It can also be confirmed that the equipotential lines can be converged more effectively.

Therefore, by providing, in the liquid crystal layer, a structure where the dielectric film with a high dielectric constant covers the first wall-like structure body with a low dielectric constant formed over the first electrode layer and the dielectric film with a high dielectric constant covers the second wall-like structure body with a low dielectric constant formed over the second electrode layer, when a voltage is applied between the first electrode layer and the second electrode layer, a strong electric field can be evenly generated more widely between the structure bodies.

A liquid crystal material exhibiting a blue phase is used for the liquid crystal layer 208. The liquid crystal material exhibiting a blue phase has a short response time of 1 msec or less and enables high-speed response, whereby higher performance of the liquid crystal display device can be achieved.

The liquid crystal material exhibiting a blue phase includes liquid crystal and a chiral agent. The chiral agent is employed to align the liquid crystal in a helical structure and to make the liquid crystal exhibit a blue phase. For example, a liquid crystal material into which a chiral agent is mixed at several weight percent or more may be used for the liquid crystal layer.

As the liquid crystal, thermotropic liquid crystal, low-molecular liquid crystal, high-molecular liquid crystal, ferroelectric liquid crystal, anti-ferroelectric liquid crystal, or the like is used.

As the chiral agent, a material having high compatibility with liquid crystal and strong twisting power is used. Either an R-enantiomer or an S-enantiomer is used, and a racemic mixture in which an R-enantiomer and an S-enantiomer are mixed at 50:50 is not used.

The above liquid crystal material exhibits a cholesteric phase, a cholesteric blue phase, a smectic phase, a smectic blue phase, a cubic phase, a chiral nematic phase, an isotropic phase, or the like depending on a condition.

A cholesteric blue phase and a smectic blue phase, which are blue phases, are seen in a liquid crystal material having a cholesteric phase or a smectic phase with a relatively short helical pitch of less than or equal to 500 nm. The alignment of the liquid crystal material has a double twist structure. An optical modulation action occurs through a change in alignment by voltage application. A blue phase is optically isotropic and thus has no viewing angle dependence. That is why an alignment film is not necessarily formed; therefore, display image quality can be improved and the cost can be reduced.

The blue phase appears only within a narrow temperature range; therefore, it is preferable that a photocurable resin and a photopolymerization initiator be added to a liquid crystal material and polymer stabilization treatment be performed in order to widen the temperature range. The polymer stabilization treatment is performed in such a manner that a liquid crystal material including liquid crystal, a chiral agent, a photocurable resin, and a photopolymerization initiator is irradiated with light having a wavelength with which the photocurable resin and the photopolymerization initiator react. This polymer stabilization treatment may be performed by irradiating a liquid crystal material exhibiting an isotropic phase with light or by irradiating a liquid crystal material exhibiting a blue phase under the control of the temperature with light.

The photocurable resin may be a monofunctional monomer such as acrylate or methacrylate; a polyfunctional monomer such as diacrylate, triacrylate, dimethacrylate, or trimethacrylate; or a mixture thereof. Further, the photocurable resin may have liquid crystallinity, non-liquid crystallinity, or both of them. A resin which is cured with light having a wavelength with which the photopolymerization initiator to be used reacts may be selected as the photocurable resin, and an ultraviolet curable resin can be typically used.

As the photopolymerization initiator, a radical polymerization initiator which generates radicals by light irradiation, an acid generator which generates an acid by light irradiation, or a base generator which generates a base by light irradiation may be used.

Specifically, a mixture of JC-1041XX (produced by Chisso Corporation) and 4-cyano-4'-pentylbiphenyl may be used as the liquid crystal material. As the chiral agent, ZLI-4572 (produced by Merck Ltd., Japan) may be used. As the photocurable resin, 2-ethylhexyl acrylate, RM257 (produced by Merck Ltd., Japan), or trimethylolpropane triacrylate may be used. As the photopolymerization initiator, 2,2-dimethoxy-2-phenylacetophenone may be used.

Although not illustrated in FIGS. 1A to 1C, an optical film such as a polarizing plate, a retardation plate, or an anti-reflection film, or the like is provided as appropriate. For example, circular polarization with the polarizing plate and the retardation plate may be used. In addition, a backlight or the like may be used as a light source.

In the case where, in this specification, the liquid crystal display device is a transmissive liquid crystal display device in which display is performed by transmission of light (or a transflective liquid crystal display device), it is necessary to transmit light at least in a pixel region. Therefore, the first substrate, the second substrate, and thin films of an insulating film, a conductive film, and the like which are present in the pixel region through which light is transmitted all transmit visible light.

It is preferable that the first electrode layer (pixel electrode layer) and the second electrode layer (common electrode layer) each have a light-transmitting property; however, since they have opening patterns, a non-light-transmitting material such as a metal film may be used.

The first electrode layer (pixel electrode layer) and the second electrode layer (common electrode layer) may be formed using one or more of the following: an indium tin oxide (ITO), an indium zinc oxide (IZO) in which a zinc oxide (ZnO) is mixed into an indium oxide, a conductive material in which a silicon oxide ($SiO_2$) is mixed into an indium oxide, organoindium, organotin, an indium oxide containing a tungsten oxide, an indium zinc oxide containing a tungsten oxide, an indium oxide containing a titanium oxide, and an indium tin oxide containing a titanium oxide; metals such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), and silver (Ag); an alloy thereof; and a metal nitride thereof.

As the first substrate 200 and the second substrate 201, a quartz substrate, a plastic substrate, or a glass substrate of barium borosilicate glass, aluminoborosilicate glass, or the like typified by 7059 glass, 1737 glass, or the like manufactured by Corning, Inc. may be used.

With the above structure, the driving voltage of the liquid crystal display device including the liquid crystal layer exhibiting a blue phase can be decreased. Further, the liquid crystal layer exhibiting a blue phase can have higher reliability.

The productivity and the yield of the liquid crystal display device including the liquid crystal layer exhibiting a blue phase can be increased and the manufacturing cost can be reduced.

Furthermore, the contrast ratio of the liquid crystal display device using the liquid crystal layer exhibiting a blue phase can be increased.

(Embodiment 2)

In this embodiment, as one embodiment of the invention disclosed in this specification, an example of an active matrix liquid crystal display device will be described with reference to FIGS. 10A and 10B and FIGS. 11A to 11D.

Figure 10A:
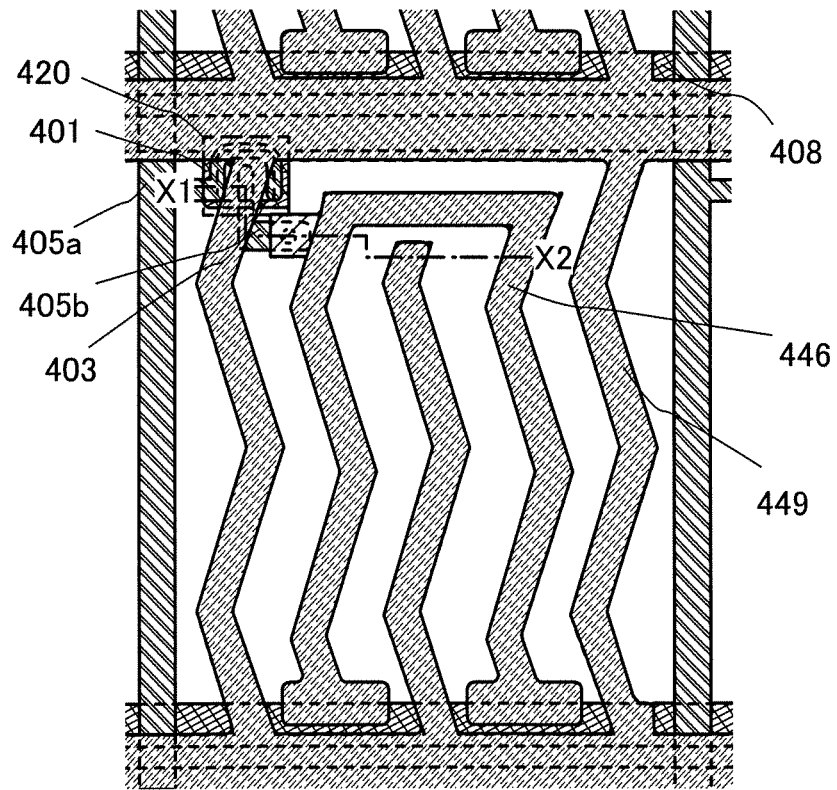
FIGS. 10A and 10B illustrate a liquid crystal display device.
Figure 10B:
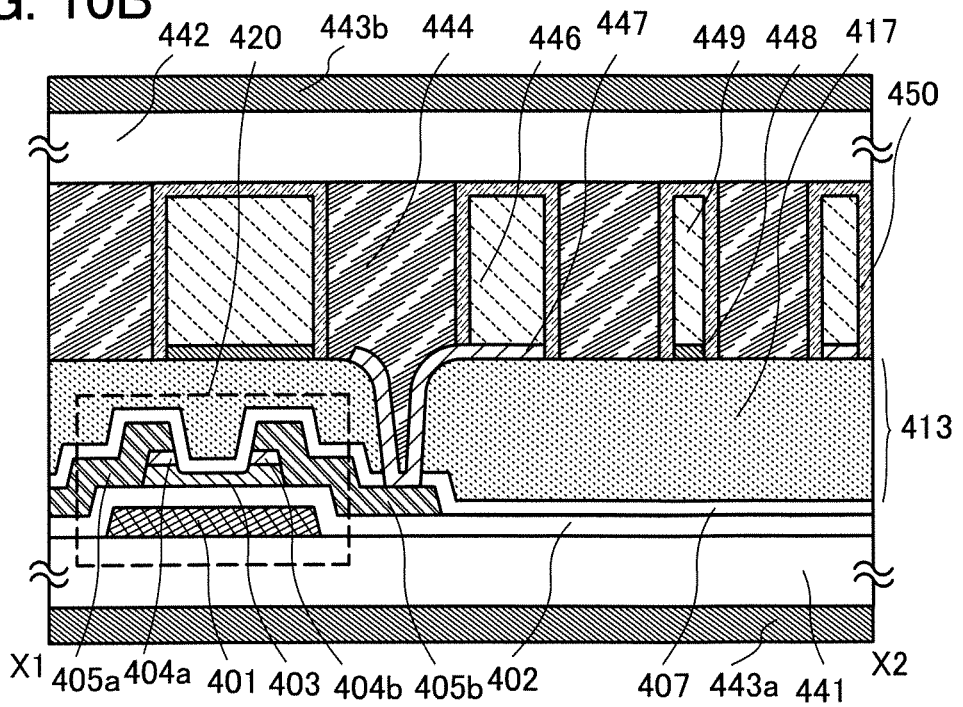

FIG. 10A is a plan view of a liquid crystal display device and illustrates one pixel. FIG. 10B is a cross-sectional view along X1-X2 in FIG. 10A.

In FIG. 10A, a plurality of source wiring layers (including a wiring layer 405a) are provided in parallel to each other (extended in the vertical direction in the drawing) and apart from each other. A plurality of gate wiring layers (including a gate electrode layer 401) are provided to be extended in a direction generally perpendicular to the source wiring layers (the horizontal direction in the drawing) and apart from each other. Capacitor wiring layers 408 are arranged to be adjacent to the plurality of gate wiring layers and extended in a direction generally parallel to the gate wiring layers, that is, in a direction generally perpendicular to the source wiring layers (in the horizontal direction in the drawing). In a space surrounded by the source wiring layers, the capacitor wiring layers 408, and the gate wiring layers, a pixel electrode layer and a common electrode layer of the liquid crystal display device are arranged with the liquid crystal layer 444 interposed therebetween (see FIG. 10B). A thin film transistor 420 for driving the pixel electrode layer is provided at the upper left corner in the drawing. A plurality of pixel electrode layers and thin film transistors are provided in matrix.

In the liquid crystal display device in FIGS. 10A and 10B, a first electrode layer 447 which is electrically connected to the thin film transistor 420 functions as the pixel electrode layer, and a second electrode layer 448 functions as the common electrode layer. Note that a capacitor is formed by the first electrode layer 447 and the capacitor wiring layer 408.

In the liquid crystal layer 444, the first wall-like structure body 446 is formed over the first electrode layer 447 that is a pixel electrode layer, and the dielectric film 450 is provided to cover them, and similarly, the second wall-like structure body 449 is formed over the second electrode layer 448 that is a common electrode layer, and the dielectric film 450 is provided to cover them.

The first electrode layer 447 which is the pixel electrode layer and the second electrode layer 448 which is the common electrode layer have opening patterns and are arranged below the liquid crystal layer 444. The first electrode layer 447 and the second electrode layer 448 are each formed to have a comb-like pattern which does not form a closed space. In order to generate an electric field between the first electrode layer 447 and the second electrode layer 448, they are provided not in contact with each other and are provided on the same insulating surface (a light-transmitting resin layer 417 in FIG. 10B) such that the teeth of their comb-like patterns are engaged with each other.

The dielectric film 450 is an insulator having a higher dielectric constant than liquid crystal materials used for the first wall-like structure body 446, the second wall-like structure body 449, and the liquid crystal layer 444. Note that the first wall-like structure body 446 and the second wall-like structure body 449 may be insulators each having a lower dielectric constant than a liquid crystal material used for the liquid crystal layer 444.

By providing, in the liquid crystal layer 444, a structure where the first wall-like structure body 446 with a low dielectric constant is formed over the first electrode layer 447, and the dielectric film 450 with a high dielectric constant covers them, and a structure where the second wall-like structure body 449 with a low dielectric constant is formed over the second electrode layer 448, and the dielectric film 450 with a high dielectric constant covers them, when a voltage is applied between the first electrode layer 447 and the second electrode layer 448, an electric field can be generated more widely between the structure bodies.

In the case where the dielectric film is formed using a material with a high dielectric constant, it may be difficult to form the dielectric film to have a high height (large thickness). However, the first wall-like structure body 446 and the second wall-like structure body 449 are formed with the use of a material having a lower dielectric constant so that they have desired heights and the structure bodies are covered with the dielectric film 450 formed using a material with a higher dielectric constant in the present invention, whereby the height of the dielectric film can be increased to the extent that is difficult to realize only with a material having a high dielectric constant. Even if the height (thickness) of the dielectric film 450 covering them is low (small), an effect close to that obtained when the structure bodies are formed only with a material having a high dielectric constant can be achieved.

In the liquid crystal layer 444 exhibiting a blue phase, the alignment of liquid crystal molecules can be changed only in the local area where an electric field is generated. However, when the structure bodies formed with a material having a low dielectric constant are covered with the dielectric film formed using a material having a high dielectric constant, an electric field can be generated more widely in the liquid crystal layer 444, so that the alignment of the liquid crystal molecules can be changed in the wide area where the electric field is generated. Thus, the white transmittance can be increased, which leads to higher contrast in the liquid crystal display device including the liquid crystal layer exhibiting a blue phase.

Further, the liquid crystal layer exhibiting a blue phase, which is likely to be influenced by local concentration of an electric field, can be driven with a load on the liquid crystal layer reduced; therefore, reliability of the liquid crystal layer exhibiting a blue phase can be increased and the driving voltage can be reduced.

The heights of the structure bodies can be easily controlled; thus, the productivity and the yield can be increased and the manufacturing cost can be reduced.

Further, when the first wall-like structure body 446 with a low dielectric constant is formed over the first electrode layer 447 and they are covered with the dielectric film 450 with a high dielectric constant, and the second wall-like structure body 449 with a low dielectric constant is formed over the second electrode layer 448 and they are also covered with the dielectric film 450 with a high dielectric constant, lines of electric force from the first electrode layer 447 into the second electrode layer 448 can be refracted at the interface between the dielectric film 450 having a high dielectric constant and the first wall-like structure body 446 and the interface between the dielectric film 450 having a high dielectric constant and the second wall-like structure body 449. The lines of electric force in the liquid crystal layer 444 have flatter arch shapes when the dielectric film formed using a material having a high dielectric constant covers the structure body formed using a material having a low dielectric constant; thus, the lines of electric force which detour through the second substrate 442 are brought back into the liquid crystal layer 444. Therefore, the density of the lines of electric force increases in a region between the structure bodies and the lines of electric force can be converged effectively, so that a stronger electric field can be generated. Moreover, the proportion of a horizontal component of the lines of electric force increases in the vicinity of the first electrode layer 447 and the second electrode layer 448; therefore, reduced is a difference between the strength of an electric field which acts in the vicinity of the first electrode layer 447 and the second electrode layer 448 and the strength of an electric field which acts in the vicinity of a central line between the first electrode layer 447 and the second electrode layer 448. Since variation in electric field decreases, a more even electric field can be generated.

Therefore, a strong electric field can be generated more evenly between the dielectric film 450 covering the first electrode layer 447 and the first wall-like structure body 446, and the dielectric film 450 covering the second electrode layer 448 and the second wall-like structure body 449, when a voltage is applied between the first electrode layer 447 and the second electrode layer 448.

As in the liquid crystal display device in FIGS. 10A and 10B described in this embodiment, the dielectric film 450 may be provided in contact with the second substrate 442 facing a first substrate 441. As in this embodiment, the dielectric film 450 covering the first electrode layer 447, the first wall-like structure body 446, the second electrode layer 448, and the second wall-like structure body 449 is provided in contact with the second substrate 442 facing the first substrate 441, whereby an electric field can be generated in the whole liquid crystal layer 444. The dielectric film 450 is formed using a material having a higher dielectric constant than the first wall-like structure body 446, the second wall-like structure body 449. and the liquid crystal layer 444. When a material preferably having a dielectric constant of 12 or more or more preferably having a dielectric constant of 20 or more is used, a strong electric field can be generated more evenly between the structure bodies. Note that the first wall-like structure body 446 and the second wall-like structure body 449 may be insulators whose dielectric constant is lower than that of the liquid crystal layer 444 exhibiting a blue phase.

Note that in the case where a coloring layer functioning as a color filter, a light-blocking layer functioning as a black matrix, an insulating layer, or the like is formed between the second substrate 442 and the liquid crystal layer 444, the dielectric film 450 and a film which is in contact with the liquid crystal layer 444 and on the second substrate 442 are in contact with each other.

When a strong electric field can be generated more evenly in the liquid crystal layer 444, a driving voltage of the liquid crystal display device can be reduced. Further, the liquid crystal layer 444 exhibiting a blue phase which is likely to be influenced by local concentration of an electric field is not easily loaded, so that the liquid crystal layer 444 exhibiting a blue phase can have higher reliability.

When the alignment of liquid crystal molecules in the liquid crystal layer 444 exhibiting a blue phase can be changed in a wider area, white transmittance can be increased and thus contrast in the liquid crystal display device including the liquid crystal layer 444 exhibiting a blue phase can be improved.

The heights of the structure bodies can be easily controlled, so that the productivity and the yield can be increased and the manufacturing cost can be reduced.

The first waft-like structure body 446, the second wall-like structure body 449, and the dielectric film 450 can each be formed using an insulator including an insulating material (an organic material and/or an inorganic material). Typically, a visible light curable resin, an ultraviolet curable resin, a thermosetting resin, or a thermoplastic resin is preferably used. For example, an acrylic resin, an epoxy resin, an amine resin, a pullulan derivative, or the like may be used. Alternatively, an organic-inorganic composite material of an inorganic material and an organic material may be used, and for example, an organic-inorganic composite material of barium titanate and an organic resin or the like can be used. The dielectric film 450 is formed using a material having a higher dielectric constant than the first wall-like structure body 446, the second wall-like structure body 449, and a liquid crystal material used. A material with a dielectric constant of 12 or more is preferably used. Further, a material with a dielectric constant of 20 or more is particularly preferable. Note that the first wall-like structure body 446 and the second wall-like structure body 449 may each be formed using a material having a lower dielectric constant than the liquid crystal material used.

The methods for forming the first wall-like structure body 446, the second wall-like structure body 449, and the dielectric film 450 are not particularly limited, and any of dry methods such as evaporation, sputtering, and CVD and wet methods such as spin coating, dip coating, spray coating, a droplet discharging method (an inkjet method), nanoimprinting, and various printing methods (screen printing or offset printing) may be used depending on the material. As needed, an etching method (dry etching or wet etching) may be employed to form a desired pattern.

The first wall-like structure body 446 and the second wall-like structure body 449 may each have a columnar shape or a conical or pyramidal shape with a plane top surface and a trapezoidal cross section, a conical or pyramidal shape with a rounded top surface, or the like. The first wall-like structure body 446 and the second wall-like structure body 449 may reflect the shapes of the first electrode layer 447 and the second electrode layer 448, respectively, to have shapes similar to the respective shapes. In order to fill a space between the first substrate and the second substrate with the liquid crystal layer 444, the structure bodies are formed to have shapes by which a space is not formed in a pixel region. As for the shape of the dielectric film 450, there may be a difference between the thicknesses of the dielectric film 450. Note that it is preferable that the distance between the first electrode layer 447 and the second electrode layer 448 be 0.2 µm to 10 µm (more preferably, 0.2 µm to 2 µm), and typically, the distance is preferably 0.8 µm to 2 µm.

The thickness (cell gap) of the liquid crystal layer 444 is preferably about 5 µm to 20 µm. The heights (thicknesses) of the first wall-like structure body 446 and the second wall-like structure body 449 are each preferably approximately greater than or equal to 1.0 µm and smaller than or equal to the thickness (cell gap) of the liquid crystal layer 444. Note that when the height (thickness) of the dielectric film 450 is greater than 100 nm, an adequate effect can be achieved.

In the case where the dielectric film 450 covering the first electrode layer 447, the second electrode layer 448, the first wall-like structure body 446, and the second wall-like structure body 449 is provided in contact with the second substrate 442 facing the first substrate 441, the structure bodies and the dielectric film can function as spacers. In that case, the sum of the heights (thicknesses) of the first wall-like structure body 446 and the dielectric film 450 covering the structure body and the sum of the heights (thicknesses) of the second wall-like structure body 449 and the dielectric film 450 covering the structure body each roughly correspond to the thickness of the liquid crystal layer 444 (a so-called cell thickness). Owing to such a structure, an effect similar to that obtained from the structure where structure bodies are formed using only a material with a high dielectric constant.

The first wall-like structure body 446 and the second wall-like structure body 449 may be selectively provided over the first electrode layer 447 and the second electrode layer 448, respectively. For example, in the case where the first electrode layer 447 and the second electrode layer 448 have complicated shapes, the first wall-like structure body 446 and the second wall-like structure body 449 are selectively provided; thus, injection of the liquid crystal material and the filling with the liquid crystal material are facilitated, and process time can be shortened.

The first wall-like structure body 446 and the second wall-like structure body 449 can be formed in such a manner that an insulating film is formed so as to cover the first electrode layer 447 and the second electrode layer 448, and the insulating film is selectively etched. In this etching step, the insulating film between the first electrode layer 447 and the second electrode layer 448 may partially remain instead of being removed completely (a remaining portion is also referred to as a third wall-like structure body). The dielectric film 450 is formed using an insulating film covering surfaces of the first wall-like structure body 446 provided over the first electrode layer 447 and the second wall-like structure body 449 provided over the second electrode layer 448, and the insulating film between the first electrode layer 447 and the second electrode layer 448 may be etched to be completely removed.

The thin film transistor 420 is an inverted staggered thin film transistor which includes, over the first substrate 441 having an insulating surface, the gate electrode layer 401, a gate insulating layer 402, a semiconductor layer 403, $n^+$ layers 404a and 404b serving as source and drain regions, and the wiring layers 405a and 405b serving as source and drain electrode layers. The $n^+$ layers 404a and 404b are semiconductor layers having lower resistance than the semiconductor layer 403.

An insulating film 407 is provided in contact with the semiconductor layer 403 so as to cover the thin film transistor 420. An interlayer film 413 is provided over the insulating film 407, the first electrode layer 447 is formed over the interlayer film 413, and the second electrode layer 448 is formed with the liquid crystal layer 444 and the dielectric film 450 interposed between the electrode layers.

The liquid crystal display device can be provided with a color filter. The color filter may be provided on an outer side of the first substrate 441 and the second substrate 442 (on a side opposite to the liquid crystal layer 444) or on an inner side of the first substrate 441 and the second substrate 442.

When full-color display is performed in the liquid crystal display device, the color filter may be formed of materials exhibiting red (R), green (G), and blue (B). When monochrome display is performed, the coloring layer may be omitted or formed of a material exhibiting at least one color. Note that the color filter is not always provided in the case where light-emitting diodes (LEDs) of RGB or the like are arranged in a backlight unit and a successive additive color mixing method (a field sequential method) is employed in which color display is performed by time division.

FIGS. 10A and 10B illustrate an example of a liquid crystal display device in which a chromatic-color light-transmitting resin layer 417 which functions as a color filter is used as the interlayer film 413.

In the case of providing a color filter on the counter substrate side, precise positional alignment of a pixel region with an element substrate over which a thin film transistor is formed is difficult and accordingly, there is a possibility that image quality is degraded. Here, since the interlayer film is formed as the color filter directly on the element substrate side, the formation region can be controlled more precisely and this structure is adaptable to a pixel with a fine pattern. In addition, one insulating layer can serve as both the interlayer film and the color filter, whereby the process can be simplified and the liquid crystal display device can be manufactured at low cost.

As the light-transmitting chromatic resin layer, a photosensitive or non-photosensitive organic resin can be used. A photosensitive organic resin is preferably used because the number of resist masks can be reduced and thus the process can be simplified. In addition, since a contact hole formed in the interlayer film has an opening shape with a curvature, coverage with a film such as an electrode layer formed in the contact hole can be improved.

Chromatic colors are colors except achromatic colors such as black, gray, and white. The coloring layer is formed of a material which transmits only chromatic light in order to function as the color filter. As chromatic color, red, green, blue, or the like may be used. Alternatively, cyan, magenta, yellow, or the like may be used. "Transmitting only the chromatic light" means that light transmitted through the coloring layer has a peak at the wavelength of the chromatic light.

In order that the light-transmitting chromatic resin layer 417 may function as a coloring layer (color filter), the thickness thereof is preferably adjusted as appropriate to be the most suitable thickness in consideration of the relation between the concentration of a coloring material to be contained and light transmittance. In the case where the interlayer film 413 is formed by stacking a plurality of thin films, at least one layer thereof needs to be a light-transmitting chromatic resin layer so that the interlayer film 413 can function as a color filter.

In the case where the thickness of the light-transmitting chromatic resin layer differs depending on the chromatic colors or in the case where there is surface unevenness due to the light-blocking layer or the thin film transistor, an insulating layer which transmits light in a visible wavelength range (so-called colorless and transparent insulating layer) may be stacked for planarization of the surface of the interlayer film. Improvement in planarity of the interlayer film enables favorable coverage with the first electrode layer (pixel electrode layer) or the second electrode layer (common electrode layer) to be formed thereover and uniform gap (thickness) of the liquid crystal layer, whereby the visibility of the liquid crystal display device is increased and higher image quality can be achieved.

The formation method of the interlayer film 413 (the light-transmitting chromatic resin layer 417) is not particularly limited, and the following method may be employed in accordance with the material: spin coating, dip coating, spray coating, a droplet discharging method (e.g., an inkjet method, screen printing, or offset printing), or with a tool (equipment) such as a doctor knife, a roll coater, a curtain coater, or a knife coater.

The first substrate 441 and the second substrate 442 are light-transmitting substrates and are provided with a polarizing plate 443a and a polarizing plate 443b, respectively, on their outer sides (the sides opposite to the side where the liquid crystal layer 444 is provided).

The process for manufacturing the liquid crystal display device illustrated in FIGS. 10A and 10B will be described with reference to FIGS. 11A to 11D. FIGS. 11A to 11D are cross-sectional views illustrating the manufacturing process of the liquid crystal display device. Note that a first electrode layer, a second electrode layer, a first wall-like structure body, a second wall-like structure body, and a dielectric film are omitted in FIGS. 11A to 11D. The structures of the first electrode layer, the second electrode layer, the first wall-like structure body, the second wall-like structure body, and the dielectric film in FIGS. 10A and 10B can be used for the first electrode layer, the second electrode layer, the first wall-like structure body, the second wall-like structure body, and the dielectric film illustrated in FIGS. 11A to 11D, and the mode of a lateral electric field applied to the first electrode layer, the first wall-like structure body, the dielectric film covering the first electrode layer and the first wall-like structure body, the second electrode layer, the second wall-like structure body, and the dielectric film covering the second electrode layer and the second wall-like structure body, in the liquid crystal layer, can be employed.

Figure 11A:
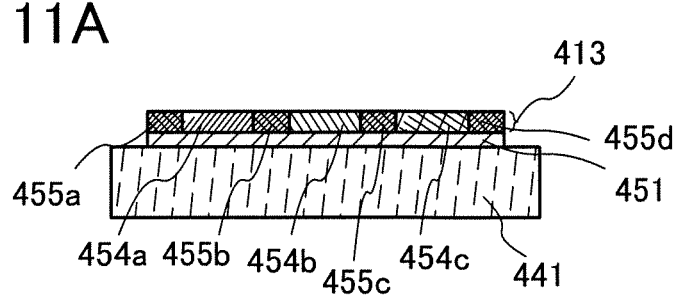
FIGS. 11A to 11D illustrate a method for manufacturing a liquid crystal display device.

In FIG. 11A, an element layer 451 is formed over the first substrate 441 which is an element substrate, and the interlayer film 413 is formed over the element layer 451.

The interlayer film 413 includes light-transmitting chromatic resin layers 454a, 454b, and 454c and light-blocking layers 455a, 455b, 455c, and 455d. The light-blocking layers 455a, 455b, 455c, and 455d and the light-transmitting chromatic resin layers 454a, 454b, and 454c are alternately arranged such that the light-transmitting chromatic resin layer is interposed between the light-blocking layers. Note that the first electrode layer, the second electrode layer, the first wall-like structure body, the second wall-like structure body, and the dielectric film are omitted in FIGS. 11A to 11D.

Figure 11B:
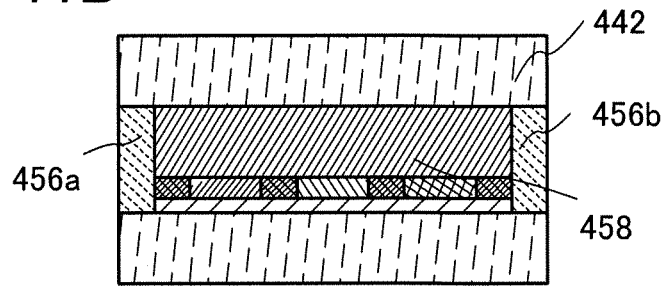

As illustrated in FIG. 11B, the first substrate 441 and the second substrate 442 which is a counter substrate are firmly attached to each other with sealants 456a and 456b with the liquid crystal layer 458 interposed between the substrates. The liquid crystal layer 458 may be formed by a dispenser method (dropping method), or an injecting method by which liquid crystal is injected using a capillary phenomenon after the first substrate 441 and the second substrate 442 are bonded to each other.

A liquid crystal material exhibiting a blue phase may be used for the liquid crystal layer 458. The liquid crystal layer 458 is formed using a liquid crystal material including liquid crystal, a chiral agent, a photocurable resin, and a photopolymerization initiator.

As the sealants 456a and 456b, typically, a visible light curable resin, an ultraviolet curable resin, or a thermosetting resin is preferably used. Typically, an acrylic resin, an epoxy resin, an amine resin, or the like may be used. Further, a photopolymerization initiator (typically, an ultraviolet light polymerization initiator), a thermosetting agent, a filler, or a coupling agent may be included in the sealants 456a and 456b.

Figure 11C:
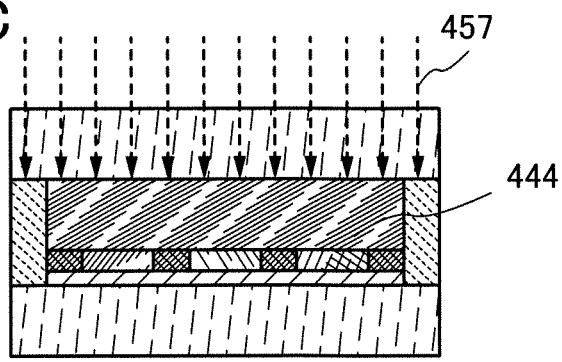

As illustrated in FIG. 11C, polymer stabilization treatment is performed by irradiating the liquid crystal layer 458 with light 457 so that the liquid crystal layer 444 is formed. The light 457 is light having a wavelength with which the photocurable resin and the photopolymerization initiator included in the liquid crystal layer 458 react. By this polymer stabilization treatment with light irradiation, the temperature range in which the liquid crystal layer 444 exhibits a blue phase can be widened.

In the case where a photocurable resin such as an ultraviolet curable resin is used as a sealant and a liquid crystal layer is formed by a dropping method, for example, the sealant may be cured in the light irradiation step of the polymer stabilization treatment.

As illustrated in FIGS. 11A to 11D, when the liquid crystal display device has a structure in which the light-transmitting chromatic resin layer and the light-blocking layer are formed over the element substrate, light from the counter substrate side is not absorbed or blocked by the light-transmitting chromatic resin layer and the light-blocking layer; accordingly, the entire liquid crystal layer can be uniformly irradiated with light. Thus, alignment disorder of liquid crystal due to non-uniform photopolymerization, display unevenness due to the alignment disorder, and the like can be prevented. Further, a thin film transistor can also be shielded from light by the light-blocking layer, whereby defects in electric characteristics due to the light irradiation can be prevented.

Figure 11D:
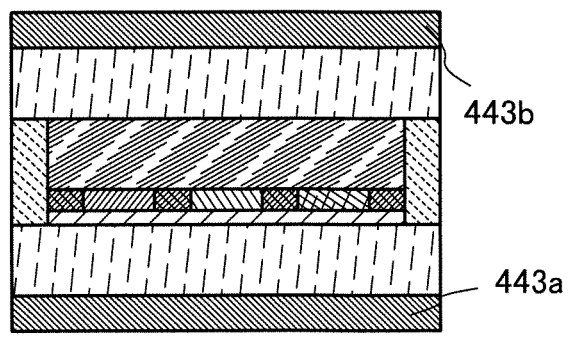

As illustrated in FIG. 11D, the polarizing plate 443a is provided on the outer side (on the side opposite to the liquid crystal layer 444) of the first substrate 441, and the polarizing plate 443b is provided on the outer side (on the side opposite to the liquid crystal layer 444) of the second substrate 442. In addition to the polarizing plate, an optical film such as a retardation plate or an anti-reflection film may be provided. For example, circular polarization with the polarizing plate and the retardation plate may be used. Through the above process, the liquid crystal display device can be completed.

In the case of manufacturing a plurality of liquid crystal display devices with the use of a large-sized substrate (a so-called multiple panel method), at division step may be performed before performing the polymer stabilization treatment or before providing the polarizing plates. In consideration of the influence of the division step on the liquid crystal layer (such as alignment disorder due to force applied in the division step), it is preferable that the division step be performed after attaching the first substrate and the second substrate and before performing the polymer stabilization treatment.

Although not illustrated, a backlight, a sidelight, or the like may be used as a light source. Light from the light source is emitted from the side of the first substrate 441 which is an element substrate so as to pass through the second substrate 442 on the viewing side.

The first electrode layer 447 and the second electrode layer 448 may be formed using a light-transmitting conductive material such as an indium oxide containing a tungsten oxide, an indium zinc oxide containing a tungsten oxide, an indium oxide containing a titanium oxide, an indium tin oxide containing a titanium oxide, an indium tin oxide (hereinafter referred to as ITO), an indium zinc oxide, or an indium tin oxide to which a silicon oxide is added.

The first electrode layer 447 and the second electrode layer 448 may be formed using one or more kinds of materials selected from metals such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), and silver (Ag); an alloy thereof; and a nitride thereof.

A conductive composition containing a conductive macromolecule (also referred to as a conductive polymer) may be used to form the first electrode layer 447 and the second electrode layer 448. The pixel electrode formed using the conductive composition preferably has a sheet resistance of less than or equal to 10000 ohms per square and a transmittance of greater than or equal to 70% at a wavelength of 550 nm. Further, the resistivity of the conductive macromolecule included in the conductive composition is preferably less than or equal to 0.1 $\Omega \cdot cm$.

As the conductive macromolecule, a so-called π-electron conjugated conductive macromolecule may be used. For example, polyaniline or a derivative thereof, polypyrrole or a derivative thereof, polythiophene or a derivative thereof, and a copolymer of two or more of aniline, pyrrole, and thiophene or a derivative thereof can be given.

An insulating film which functions as a base film may be provided between the substrate 441 and the gate electrode layer 401. The base film has a function of preventing diffusion of an impurity element from the first substrate 441, and may be formed to have a single-layer or layered structure using one or more of a silicon nitride film, a silicon oxide film, a silicon nitride oxide film, and a silicon oxynitride film. The gate electrode layer 401 may be formed to have a single-layer or layered structure using any of metal materials such as molybdenum, titanium, chromium, tantalum, tungsten, aluminum, copper, neodymium, and scandium, and an alloy material which contains any of these materials as its main component. By using a light-blocking conductive film as the gate electrode layer 401, light from a backlight (light emitted through the first substrate 441) can be prevented from entering the semiconductor layer 403.

For example, as a two-layer structure of the gate electrode layer 401, the following structures are preferable: a two-layer structure where a molybdenum layer is stacked over an aluminum layer, a two-layer structure where a molybdenum layer is stacked over a copper layer, a two-layer structure where a titanium nitride layer or a tantalum nitride layer is stacked over a copper layer, and a two-layer structure of a titanium nitride layer and a molybdenum layer. As a three-layer structure, a stack of a tungsten layer or a tungsten nitride layer, a layer of an alloy of aluminum and silicon or an alloy of aluminum and titanium, and a titanium nitride layer or a titanium layer is preferable.

The gate insulating layer 402 may be formed to have a single-layer or layered structure using any of a silicon oxide layer, a silicon nitride layer, a silicon oxynitride layer, and a silicon nitride oxide layer by a plasma CVD method, a sputtering method, or the like. Alternatively, the gate insulating layer 402 may be formed using a silicon oxide layer by a CVD method using an organosilane gas. As an organosilane gas, a silicon-containing compound such as tetraethoxysilane (TEOS) (chemical formula: $Si(OC_2H_5)_4$), tetramethylsilane (TMS) (chemical formula: $Si(CH_3)_4$), tetramethylcyclotetrasiloxane (TMCTS), octamethylcyclotetrasiloxane (OMCTS), hexamethyldisilazane (HMDS), triethoxysilane (chemical formula: $SiH(OC_2H_5)_3$), or trisdimethylaminosilane (chemical formula: $SiH(N(CH_3)_2)_3$) may be used.

In the manufacturing process of the semiconductor layer, the n⁺ layers, and the wiring layers, an etching step is used to process thin films into desired shapes. Dry etching or wet etching may be used for the etching step.

As an etching apparatus used for the dry etching, an etching apparatus using a reactive ion etching method (RIE method), or a dry etching apparatus using a high-density plasma source such as ECR (electron cyclotron resonance) or ICP (inductively coupled plasma) may be used. As a dry etching apparatus by which uniform electric discharge can be obtained over a wider area as compared to an ICP etching apparatus, there is an ECCP (enhanced capacitively coupled plasma) mode apparatus in which an upper electrode is grounded, a high-frequency power source at 13.56 MHz is connected to a lower electrode, and further a low-frequency power source at 3.2 MHz is connected to the lower electrode. This ECCP mode etching apparatus can be applied even when a substrate of the tenth generation with a side of larger than 3 m is used as the substrate, for example.

In order to etch the films into desired shapes, the etching condition (the amount of power applied to a coiled electrode, the amount of power applied to an electrode on the substrate side, the temperature of the electrode on the substrate side, or the like) is adjusted as appropriate.

Further, the etching condition (etchant, etching time, temperature, or the like) is adjusted as appropriate depending on a material so that the films can be etched to have desired shapes.

As a material of the wiring layers 405a and 405b, an element selected from Al, Cr, Ta, Ti, Mo, and W, an alloy containing any of the above elements as its component, an alloy containing any of the above elements in combination, and the like can be given. Further, in the case where heat treatment is performed, the conductive film preferably has heat resistance against the heat treatment. For example, since use of aluminum alone brings disadvantages such as low heat resistance and a tendency to corrosion, aluminum is used in combination with a conductive material having heat resistance. As the conductive material having heat resistance which is used in combination with aluminum, any of the following materials may be used: an element selected from titanium (Ti), tantalum (Ta), tungsten (W), molybdenum (Mo), chromium (Cr), neodymium (Nd), and scandium (Se), an alloy containing any of the above elements as its component, an alloy containing any of the above elements in combination, and a nitride containing any of the above elements as its component.

The gate insulating layer 402, the semiconductor layer 403, the n⁺ layers 404a and 404b, and the wiring layers 405a and 405b may be formed in succession without being exposed to the air. When the gate insulating layer 402, the semiconductor layer 403, the n⁺ layers 404a and 404b, and the wiring layers 405a and 405b are formed in succession without being exposed to the air, each interface of stacked layers can be obtained, which is not contaminated by atmospheric components or contaminating impurity elements floating in the air. Therefore, variation in characteristics of the thin film transistor can be reduced.

Note that part of the oxide semiconductor layer 403 is etched to have a groove (depression).

The insulating film 407 covering the thin film transistor 420 can be formed using an inorganic insulating film or an organic insulating film formed by a dry method or a wet method. For example, the insulating film 407 may be formed using a silicon nitride film, a silicon oxide film, a silicon oxynitride film, an aluminum oxide film, a tantalum oxide film, or the like by a CVD method, a sputtering method, or the like. Alternatively, an organic material such as polyimide, acrylic, benzocyclobutene, polyamide, or epoxy may be used. Other than such organic materials, it is also possible to use a low-dielectric constant material (a low-k material), a siloxane-based resin, PSG (phosphosilicate glass), BPSG (borophosphosilicate glass), or the like.

Note that the siloxane-based resin corresponds to a resin including a Si—O—Si bond formed using a siloxane-based material as a starting material. The siloxane-based resin may include as a substituent an organic group (e.g., an alkyl group or an aryl group) or a fluoro group. In addition, the organic group may include a fluoro group. A siloxane-based resin is applied by a coating method and baked; thus, the insulating film 407 can be formed.

Alternatively, the insulating film 407 may be formed by stacking plural insulating films formed using any of these materials. For example, the insulating film 407 may have a structure where an organic resin film is stacked over an inorganic insulating film.

Further, by use of a resist mask having regions with plural thicknesses (typically, two different thicknesses) which is formed using a multi-tone mask, the number of resist masks can be reduced, resulting in simplified process and lower costs.

With the above structure, the driving voltage of the liquid crystal display device including the liquid crystal layer exhibiting a blue phase can be decreased. Further, the liquid crystal layer exhibiting a blue phase can have higher reliability.

The productivity and the yield of the liquid crystal display device including the liquid crystal layer exhibiting a blue phase can be increased and the manufacturing cost can be reduced.

Furthermore, the contrast ratio of the liquid crystal display device using the liquid crystal layer exhibiting a blue phase can be increased.

(Embodiment 3)

Figure 3A:
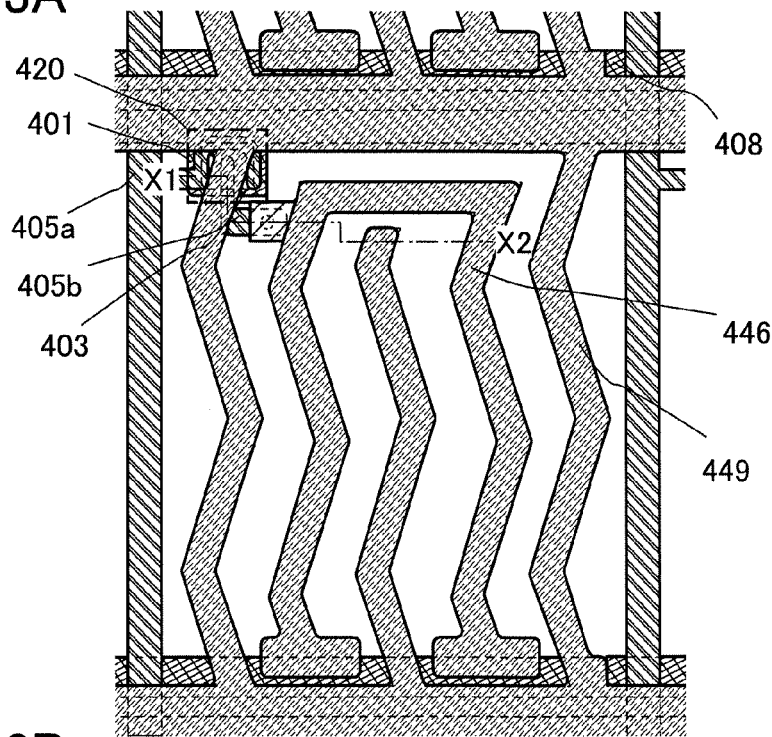
FIGS. 3A and 3B illustrate a liquid crystal display device.
Figure 3B:
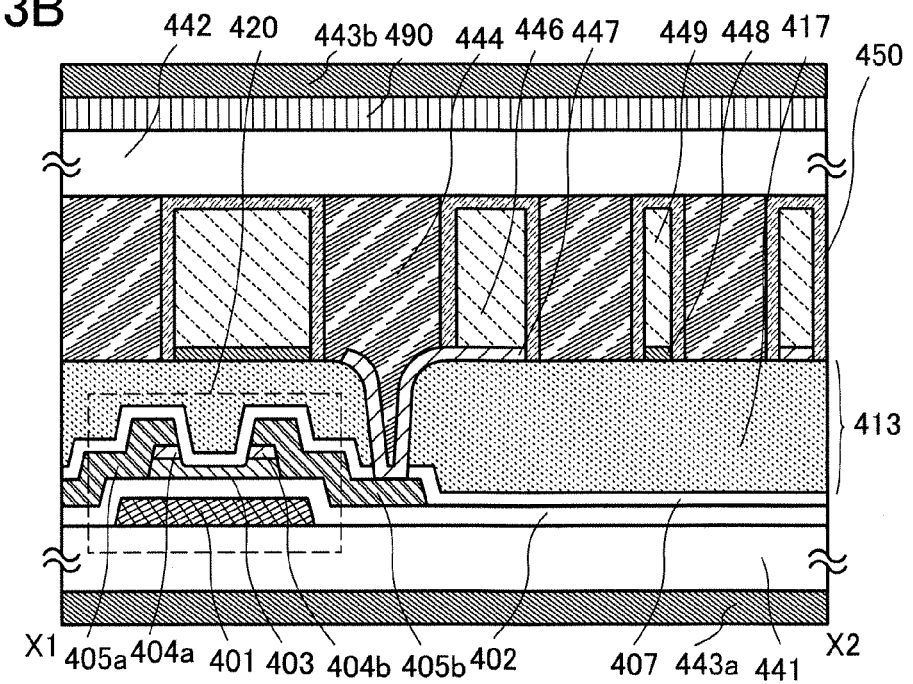

FIGS. 3A and 3B illustrate an example which is different from the structure of Embodiment 2 in that a color filter is provided on an outer side of substrates between which a liquid crystal layer is sandwiched. Note that components similar to those in Embodiments 1 and 2 can be formed using the similar materials and the similar manufacturing methods, and detailed description of the same portions and portions which have similar functions is omitted.

FIG. 3A is a plan view of a liquid crystal display device and illustrates one pixel thereof. FIG. 3B is a cross-sectional view along X1-X2 in FIG. 3A.

In the plan view of FIG. 3A, as in Embodiment 2, a plurality of source wiring layers (including the wiring layer 405a) are provided in parallel to each other (extended in the vertical direction in the drawing) and apart from each other. A plurality of gate wiring layers (including the gate electrode layer 401) are provided to be extended in a direction generally perpendicular to the source wiring layers (the horizontal direction in the drawing) and apart from each other. The capacitor wiring layers 408 are arranged to be adjacent to the plurality of gate wiring layers and extended in a direction generally parallel to the gate wiring layers, that is, in a direction generally perpendicular to the source wiring layers (in the horizontal direction in the drawing). In a space surrounded by the source wiring layers, the capacitor wiring layers 408, and the gate wiring layers, a pixel electrode layer and a common electrode layer of the liquid crystal display device are arranged. In the liquid crystal layer 444, the first wall-like structure body 446 is formed over the first electrode layer 447 that is a pixel electrode layer, and the dielectric film 450 is provided to cover them, and similarly, the second wall-like structure body 449 is formed over the second electrode layer 448 that is a common electrode layer, and the dielectric film 450 is provided to cover them. The thin film transistor 420 for driving the pixel electrode layer is provided at the upper left corner in the drawing. A plurality of pixel electrode layers and thin film transistors are provided in matrix.

FIGS. 3A and 313 illustrate an example in which the interlayer film 413 is formed so as to cover the thin film transistor 420 and a contact hole for connection to the thin film transistor 420 is formed in the interlayer film 413. The first electrode layer 447 which is a pixel electrode layer is continuously formed to cover the structure body 449 and the contact hole formed in the interlayer film 413.

In the liquid crystal display device illustrated in FIGS. 3A and 3B, a color filter 490 is provided between the second substrate 442 and the polarizing plate 443b. In such a manner, the color filter 490 may be provided on an outer side of the first substrate 441 and the second substrate 442 between which the liquid crystal layer 444 is sandwiched.

FIGS. 14A to 14D illustrate a manufacturing process of the liquid crystal display device in FIGS. 3A and 3B.

Note that in FIGS. 14A to 14D, the first electrode layer, the second electrode layer, the first wall-like structure body, the second wall-like structure body, and the dielectric film are omitted. For example, the structures of the first electrode layer, the second electrode layer, the first wall-like structure body, the second wall-like structure body, and the dielectric film in Embodiments 1 and 2 can be used for the first electrode layer, the second electrode layer, the first wall-like structure body, the second wall-like structure body, and the dielectric film, and the mode of a lateral electric field applied to the first electrode layer, the first wall-like structure body, the dielectric film covering the first electrode layer and the first wall-like structure body, the second electrode layer, the second wall-like structure body, and the dielectric film covering the second electrode layer and the second wall-like structure body, in the liquid crystal layer, can be employed.

Figure 14A:
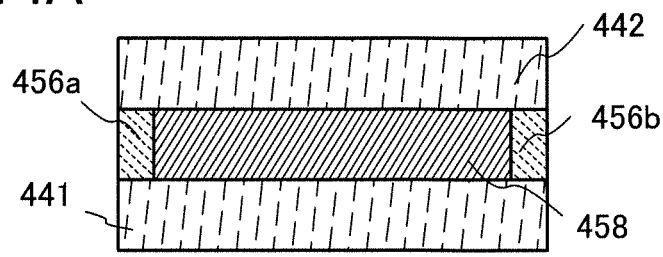
FIGS. 14A to 14D illustrate a method for manufacturing a liquid crystal display device.

As illustrated in FIG. 14A, the first substrate 441 and the second substrate 442 which is a counter substrate are firmly attached to each other with sealants 456a and 456b with the liquid crystal layer 458 interposed between the substrates. The liquid crystal layer 458 may be formed by a dispenser method (dropping method), or an injecting method by which liquid crystal is injected using a capillary phenomenon after the first substrate 441 and the second substrate 442 are bonded to each other.

A liquid crystal material exhibiting a blue phase is used for the liquid crystal layer 458. The liquid crystal layer 458 is formed using a liquid crystal material including liquid crystal, a chiral agent, a photocurable resin, and a photopolymerization initiator.

Figure 14B:
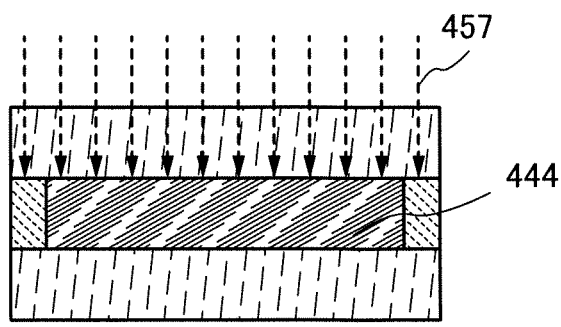

As illustrated in FIG. 14B, polymer stabilization treatment is performed by irradiating the liquid crystal layer 458 with light 457 so that the liquid crystal layer 444 is formed. The light 457 is light having a wavelength with which the photocurable resin and the photopolymerization initiator included in the liquid crystal layer 458 react. By this polymer stabilization treatment with light irradiation, the temperature range in which the liquid crystal layer 458 exhibits a blue phase can be widened.

In the case where a photocurable resin such as an ultraviolet curable resin is used as a sealant and a liquid crystal layer is formed by a dropping method, for example, the sealant may be cured in the light irradiation step of the polymer stabilization treatment.

Figure 14C:
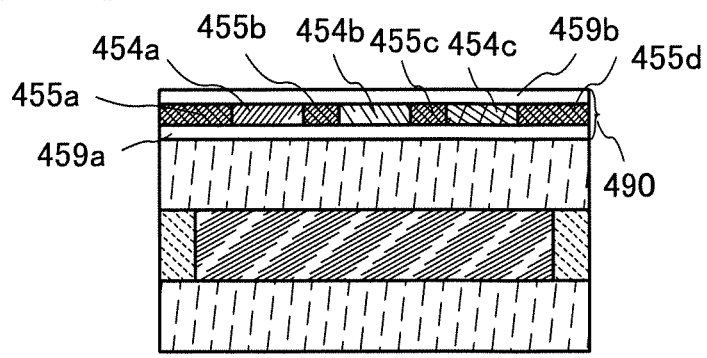

Next, as illustrated in FIG. 14C, the color filter 490 is provided on the second substrate 442 side which is the viewing side. The color filter 490 includes the light-transmitting chromatic resin layers 454a, 454b, and 454c, and the light-blocking layers 455a, 455b, 455c, and 455d functioning as black matrices, between a pair of substrates 459a and 459b. The light-blocking layers 455a, 455b, 455c, and 455d and the light-transmitting chromatic resin layers 454a, 454b, and 454e are arranged alternately such that the light-transmitting chromatic resin layer is interposed between the light-blocking layers.

Figure 14D:
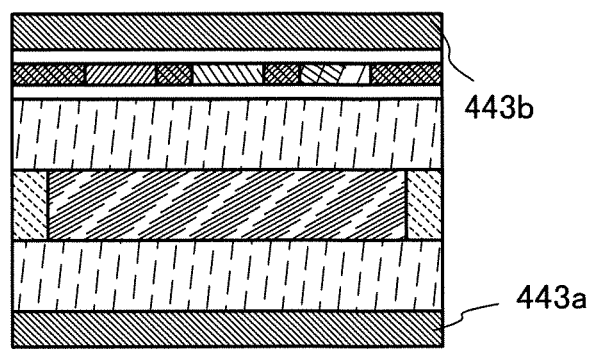

As illustrated in FIG. 14D, the polarizing plate 443a is provided on the outer side (on the side opposite to the liquid crystal layer 444) of the first substrate 441, and the polarizing plate 443b is provided on the outer side (on the side opposite to the liquid crystal layer 444) of the color filter 490. In addition to the polarizing plate, an optical film such as a retardation plate or an anti-reflection film may be provided. For example, circular polarization with the polarizing plate and the retardation plate may be used. Through the above process, the liquid crystal display device can be completed.

In the case of manufacturing a plurality of liquid crystal display devices with the use of a large-sized substrate (a so-called multiple panel method), a division step may be performed before performing the polymer stabilization treatment or before providing the polarizing plates. In consideration of the influence of the division step on the liquid crystal layer (such as alignment disorder due to force applied in the division step), it is preferable that the division step be performed after attaching the first substrate and the second substrate and before performing the polymer stabilization treatment.

Although not illustrated, a backlight, a sidelight, or the like may be used as a light source. Light from the light source is emitted from the side of the first substrate 441 which is an element substrate so as to pass through the second substrate 442 on the viewing side.

By providing, in the liquid crystal layer, a structure where a first wall-like structure body with a low dielectric constant is formed over a first electrode layer and a dielectric film with a high dielectric constant covers them, and a structure where a second wall-like structure body with a low dielectric constant is formed over a second electrode layer and a dielectric film with a high dielectric constant covers them, when a voltage is applied between the first electrode layer and the second electrode layer, an electric field can be generated more widely between the structure bodies.

In the case where the dielectric film is formed using a material with a high dielectric constant, it may be difficult to form the dielectric film to have a high height (large thickness). However, the first wall-like structure body and the second wall-like structure body are formed with the use of a material having a lower dielectric constant so that they have desired heights and the structure bodies are covered with the dielectric film formed using a material with a higher dielectric constant, whereby the height of the dielectric film can be increased to the extent that is difficult to realize only with a material having a high dielectric constant. Even if the height (thickness) of the dielectric film covering them is low (small), an effect close to that obtained when the structure bodies are formed only with a material having a high dielectric constant can be achieved.

In the liquid crystal layer exhibiting a blue phase, the alignment of liquid crystal molecules can be changed only in the local area where an electric field is generated. However, when the structure bodies formed with a material having a low dielectric constant are covered with the dielectric film having a high dielectric constant, an electric field can be generated more widely in the liquid crystal layer, so that the alignment of the liquid crystal molecules can be changed in the wide area where the electric field is generated. Thus, the white transmittance can be increased, which leads to higher contrast in the liquid crystal display device including the liquid crystal layer exhibiting a blue phase.

Further, the liquid crystal layer exhibiting a blue phase, which is likely to be influenced by local concentration of an electric field, can be driven with a load on the liquid crystal layer reduced; therefore, reliability of the liquid crystal layer exhibiting a blue phase can be increased and the driving voltage can be reduced.

The height of the structure body can be easily controlled; thus, the productivity and the yield can be increased and the manufacturing cost can be reduced.

Further, when the structure body including a material with a low dielectric constant is covered with the dielectric film including a material with a high dielectric constant, lines of electric force from the first electrode layer 447 into the second electrode layer 448 can be refracted at the interface between the dielectric film 450 having a higher dielectric constant and the first wall-like structure body 446 having a lower dielectric constant and the interface between the dielectric film 450 having a higher dielectric constant and the second wall-like structure body 449 having a lower dielectric constant. The lines of electric force in the liquid crystal layer 444 have flatter arch shapes when the dielectric film formed using a material having a high dielectric constant covers the structure body formed using a material having a low dielectric constant; thus, the lines of electric force which detour through the second substrate 442 are brought back into the liquid crystal layer 444. Therefore, the density of the lines of electric force increases in a region between the structure bodies and the lines of electric force can be converged effectively, so that a stronger electric field can be generated, Moreover, the proportion of a horizontal component of the lines of electric force increases in the vicinity of the first electrode layer 447 and the second electrode layer 448; therefore, reduced is a difference between the strength of an electric field which acts in the vicinity of the first electrode layer 447 and the second electrode layer 448 and the strength of an electric field which acts in the vicinity of a central line between the first electrode layer 447 and the second electrode layer 448. Since variation in electric field decreases, a more even electric field can be generated.

Therefore, a strong electric field can be generated more evenly between the dielectric film 450 covering the first electrode layer 447 and the first wall-like structure body 446, and the dielectric film 450 covering the second electrode layer 448 and the second wall-like structure body 449, when a voltage is applied between the first electrode layer 447 and the second electrode layer 448.

When the dielectric film is formed in contact with the second substrate facing the first substrate with the use of a material having a higher dielectric constant as in the liquid crystal display device in FIGS. 3A and 3B described in this embodiment, an electric field can be generated in the whole liquid crystal layer. The dielectric film is preferably formed using a material having a higher dielectric constant. When a material preferably having a dielectric constant of 12 or more or more preferably having a dielectric constant of 20 or more is used, a strong electric field can be generated more evenly between the structure bodies. Note that the first wall-like structure body and the second wall-like structure body may be insulators whose dielectric constant is lower than that of the liquid crystal layer 208 exhibiting a blue phase.

When a strong electric field can be generated more evenly in the liquid crystal layer exhibiting a blue phase, a driving voltage of the liquid crystal display device can be reduced. Further, a load is not easily applied to the liquid crystal layer exhibiting a blue phase which is likely to be influenced by local concentration of an electric field, so that the liquid crystal layer exhibiting a blue phase can have higher reliability.

When the alignment of liquid crystal molecules in the liquid crystal layer exhibiting a blue phase can be changed in a wider area white transmittance can be increased and thus contrast in the liquid crystal display device including the liquid crystal layer exhibiting a blue phase can be improved.

The heights of the structure bodies can be easily controlled, so that the productivity and the yield can be increased and the manufacturing cost can be reduced.

(Embodiment 4)

When thin film transistors are manufactured and used for a pixel portion and a driver circuit, a liquid crystal display device having a display function can be manufactured. Further, part or the whole of a driver circuit which includes a thin film transistor can be formed over a substrate where a pixel portion is formed, whereby a system-on-panel can be obtained.

The liquid crystal display device includes a liquid crystal element (also referred to as a liquid crystal display element) as a display element.

In addition, the liquid crystal display device includes a panel in which the display element is sealed, and a module in which an IC or the like including a controller is mounted on the panel. Furthermore, an embodiment of the present invention relates to an element substrate corresponding to one embodiment at the time before the display element is completed in a manufacturing process of the display device. The element substrate is provided with a means for supplying a current to the display element in each of a plurality of pixels. Specifically, the element substrate may be in a state in which only a pixel electrode of the display element is formed, a state in which a conductive film to be a pixel electrode has been formed and has not yet been etched to form the pixel electrode, or any other state.

Note that a liquid crystal display device in this specification refers to an image display device, a display device, or a light source (including a lighting device). Further, the liquid crystal display device includes the following modules in its category: a module including a connector such as a flexible printed circuit (FPC), a tape automated bonding (TAB) tape, or a tape carrier package (TCP); a module having a TAB tape or a TCP that is provided with a printed wiring board at the end thereof; and a module having an integrated circuit (IC) that is directly mounted on a display element by a chip on glass (COG) method.

Figure 18:
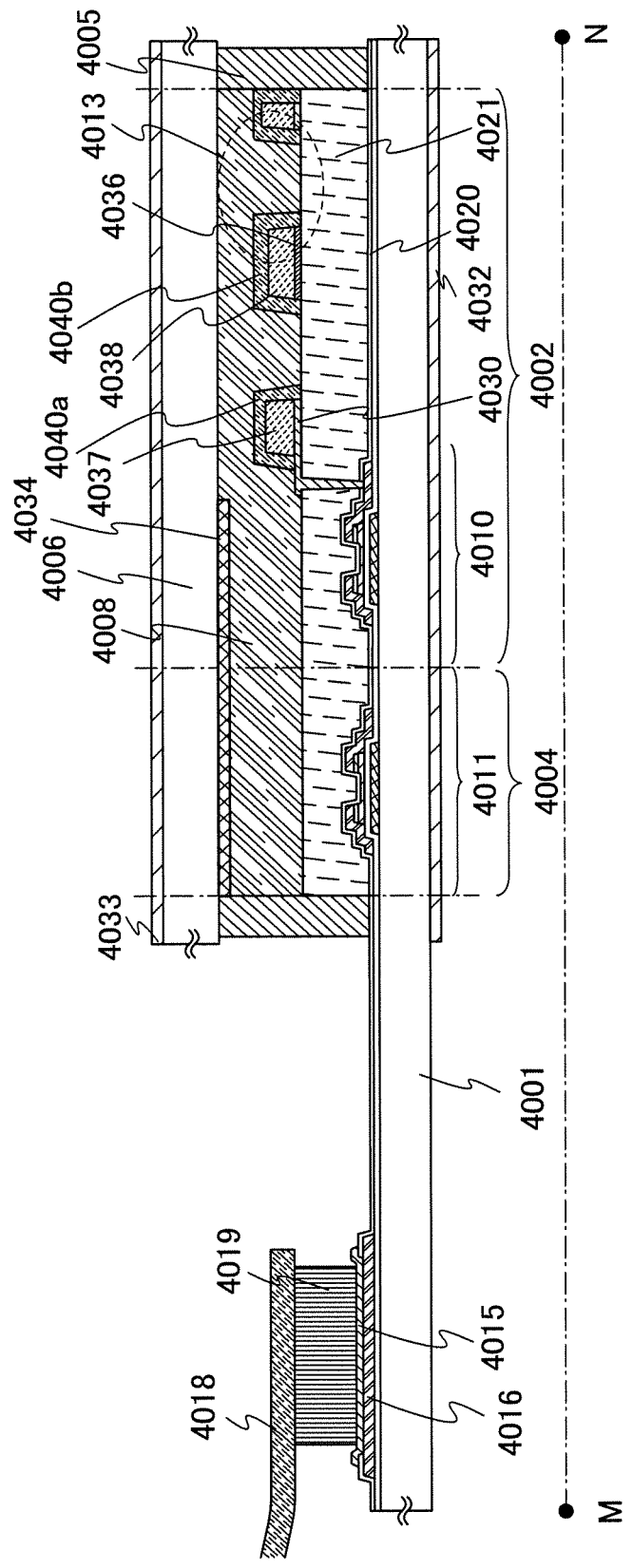
FIG. 18 illustrates a liquid crystal display device.

The appearance and a cross section of a liquid crystal display panel, which is one embodiment of a semiconductor device, will be described with reference to FIGS. 12A1, 12A2, and 12B and FIG. 18. FIGS. 12A1 and 12A2 are each a top view of a panel in which thin film transistors 4010 and 4011 and a liquid crystal element 4013 which are formed over the first substrate 4001 are sealed between the first substrate 4001 and a second substrate 4006 with a sealant 4005. FIG. 12B and FIG. 18 are each a cross-sectional view taken along line M-N of FIGS. 12A1 and 12A2.

The sealant 4005 is provided so as to surround a pixel portion 4002 and a scan line driver circuit 4004 which are provided over the first substrate 4001. The second substrate 4006 is provided over the pixel portion 4002 and the scan line driver circuit 4004. Consequently, the pixel portion 4002 and the scan line driver circuit 4004 are sealed together with a liquid crystal layer 4008, by the first substrate 4001, the sealant 4005, and the second substrate 4006.

In FIG. 12A1, a signal line driver circuit 4003 that is formed using a single crystal semiconductor film or a polycrystalline semiconductor film over a substrate separately prepared is mounted in a region that is different from the region surrounded by the sealant 4005 over the first substrate 4001. Note that FIG. 12A2 illustrates an example in which part of the signal line driver circuit is formed using a thin film transistor provided over the first substrate 4001. A signal line driver circuit 4003b is formed over the first substrate 4001, and a signal line driver circuit 4003a formed using a single crystal semiconductor film or a polycrystalline semiconductor film is mounted over a substrate prepared separately.

Note that there is no particular limitation on the connection method of the driver circuit which is separately formed. and a COG method, a wire bonding method, a TAB method, or the like can be used. FIG. 12A1 illustrates an example in which the signal line driver circuit 4003 is mounted by a COG method. FIG. 12A2 illustrates an example in which signal line driver circuit 4003a is mounted by a TAB method.

The pixel portion 4002 and the scan line driver circuit 4004 provided over the first substrate 4001 include a plurality of thin film transistors. FIG. 12B and FIG. 18 each illustrate the thin film transistor 4010 included in the pixel portion 4002 and the thin film transistor 4011 included in the scan line driver circuit 4004, as an example. An insulating layer 4020 and an interlayer film 4021 are provided over the thin film transistors 4010 and 4011.

The thin film transistor described in Embodiment 2 can be used as the thin film transistors 4010 and 4011. The thin film transistors 4010 and 4011 are n-channel thin film transistors.

FIG. 12B and FIG. 18 each illustrate an example in which a first wall-like structure body 4037, a second wall-like structure body 4038, and a dielectric film 4040 are provided over the pixel portion 4002. A pixel electrode layer 4030 electrically connected to the thin film transistor 4010 is formed over the first substrate 4001 and the interlayer film 4021, the first wall-like structure body 4037 is formed over the pixel electrode layer 4030, and they are covered with a dielectric film 4040a. Similarly, the common electrode layer 4036 is formed over the interlayer film 4021, the second wall-like structure body 4038 is formed over the common electrode layer 4036, and they are covered with the dielectric film 4040b. In FIG. 12B, the dielectric film 4040a and the dielectric film 4040b are provided in contact with the second substrate 4006. The first wall-like structure body 4037, the second wall-like structure body 4038, the dielectric film 4040 covering the first wall-like structure body 4037, and the dielectric film 4040 covering the second wall-like structure body 4038 also function as spacers and control the thickness (cell gap) of the liquid crystal layer 4008. In the case where a spacer is additionally provided, a columnar spacer obtained by selective etching of an insulating film or a spherical spacer may be used.

In the liquid crystal display device including the liquid crystal layer 4008, the thickness (cell gap) of the liquid crystal layer 4008 is preferably about 5 μm to 20 μm. The heights (thicknesses) of the first wall-like structure body 4037 and the second wall-like structure body 4038 are each preferably approximately greater than or equal to 1.0 μm and smaller than or equal to the thickness (cell gap) of the liquid crystal layer 4008. Note that when the height (thickness) of the dielectric film 4040 is greater than 100 nm, an adequate effect can be achieved.

The liquid crystal element 4013 includes the pixel electrode layer 4030, the common electrode layer 4036, and the liquid crystal layer 4008. Note that a polarizing plate 4032 and a polarizing plate 4033 are provided on the outer sides of the first substrate 4001 and the second substrate 4006, respectively.

Note that as the first substrate 4001 and the second substrate 4006, glass, plastic, or the like having a light-transmitting property may be used. As plastic, a fiberglass-reinforced plastics (FRP) plate, a polyvinyl fluoride (PVF) film, a polyester film, or an acrylic resin film may be used. Alternatively, a sheet with a structure in which an aluminum foil is sandwiched between PVF films or polyester films may be used.

Although FIGS. 12A1, 12A2, and 1213 and FIG. 18 illustrate examples of transmissive liquid crystal display devices, an embodiment of the present invention can also be applied to a transflective liquid crystal display device.

FIGS. 12A1, 12A2, and 12B and FIG. 18 illustrate examples of liquid crystal display devices in each of which a polarizing plate is provided on the outer side (the viewing side) of the substrate; however, the polarizing plate may be provided on the inner side of the substrate. The position of the polarizing plate may be determined as appropriate depending on the material of the polarizing plate and conditions of the manufacturing process. Furthermore, a light-blocking layer serving as a black matrix may be provided.

The interlayer film 4021 is a light-transmitting chromatic resin layer and functions as a color filter. A light-blocking layer may be included in part of the interlayer film 4021. In FIG. 12B and FIG. 18, a light-blocking layer 4034 is provided on the second substrate 4006 so as to overlap with the thin film transistors 4010 and 4011. By providing the light-blocking layer 4034, improvement in contrast and stabilization of the thin film transistors can be achieved.

The thin film transistor may be covered with the insulating layer 4020 functioning as a protective film; however, an embodiment of the present invention is not particularly limited thereto.

Note that the protective film is provided to prevent entry of contaminating impurities such as organic substance, metal, and moisture existing in the air and is preferably dense. The protective film may be formed to have a single-layer or layered structure using any of a silicon oxide film, a silicon nitride film, a silicon oxynitride film, a silicon nitride oxide film, an aluminum oxide film, an aluminum nitride film, an aluminum oxynitride film, and an aluminum nitride oxide film by a sputtering method.

After the protective film is formed, the semiconductor layer may be subjected to annealing (300° C. to 400° C.).

Further, in the case of further forming a light-transmitting insulating layer as a planarization insulating film, the light-transmitting insulating layer can be formed using an organic material having heat resistance, such as polyimide, acrylic, benzocyclobutene, polyamide, or epoxy. Other than such organic materials, it is also possible to use a low-dielectric constant material (a low-k material), a siloxane-based resin, PSG (phosphosilicate glass), BPSG (borophosphosilicate glass), or the like.

Note that the planarization insulating film may be formed by stacking a plurality of insulating layers formed using any of these materials.

There is no particular limitation on the formation method of the insulating layer having a layered structure, and the following method can be employed depending on the material: a sputtering method, a CVD method, an SOG method, spin coating, dip coating, spray coating, or a droplet discharging method (e.g., an inkjet method, screen printing, or offset printing), or with a tool (equipment) such as a doctor knife, a roll coater, a curtain coater, or a knife coater. In the case where the insulating layer is formed using a material solution, the semiconductor layer may be annealed (at 200° C. to 400° C.) in a baking step. The baking step of the insulating layer also serves as the annealing step of the semiconductor layer, whereby a liquid crystal display device can be manufactured efficiently.

The pixel electrode layer 4030 and the common electrode layer 4036 can be formed using a light-transmitting conductive material such as an indium oxide containing a tungsten oxide, an indium zinc oxide containing a tungsten oxide, an indium oxide containing a titanium oxide, an indium tin oxide containing a titanium oxide, an indium tin oxide (hereinafter referred to as ITO), an indium zinc oxide, or an indium tin oxide to which a silicon oxide is added.

The pixel electrode layer 4030 and the common electrode layer 4036 can be formed using one kind or plural kinds selected from metals such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), and silver (Ag); an alloy thereof; and a nitride thereof.

A conductive composition containing a conductive macromolecule (also referred to as a conductive polymer) can be used for the pixel electrode layer 4030 and the common electrode layer 4036.

Further, a variety of signals and potentials are supplied to the signal line driver circuit 4003 which is formed separately, the scan line driver circuit 4004, or the pixel portion 4002 from an FPC 4018.

Since a thin film transistor is likely to be broken due to static electricity or the like, a protective circuit for protecting the driver circuit is preferably provided over the same substrate as a gate line or a source line. The protection circuit is preferably formed using a nonlinear element.

In MS. 12A1, 12A2, and 12B, and FIG. 18, a connecting terminal electrode 4015 is formed using the same conductive film as that of the pixel electrode layer 4030, and a terminal electrode 4016 is formed using the same conductive film as that of source and drain electrode layers of the thin film transistors 4010 and 4011.

The connection terminal electrode 4015 is electrically connected to a terminal included in the FPC 4018 through an anisotropic conductive film 4019.

Note that FIGS. 12A1, 12A2, and 1213 and FIG. 18 illustrate the example in which the signal line driver circuit 4003 is formed separately and mounted on the first substrate 4001; however, an embodiment of the present invention is not limited to this structure. The scan line driver circuit may be separately formed and then mounted, or only part of the signal line driver circuit or part of the scan line driver circuit may be separately formed and then mounted.

Figure 13:
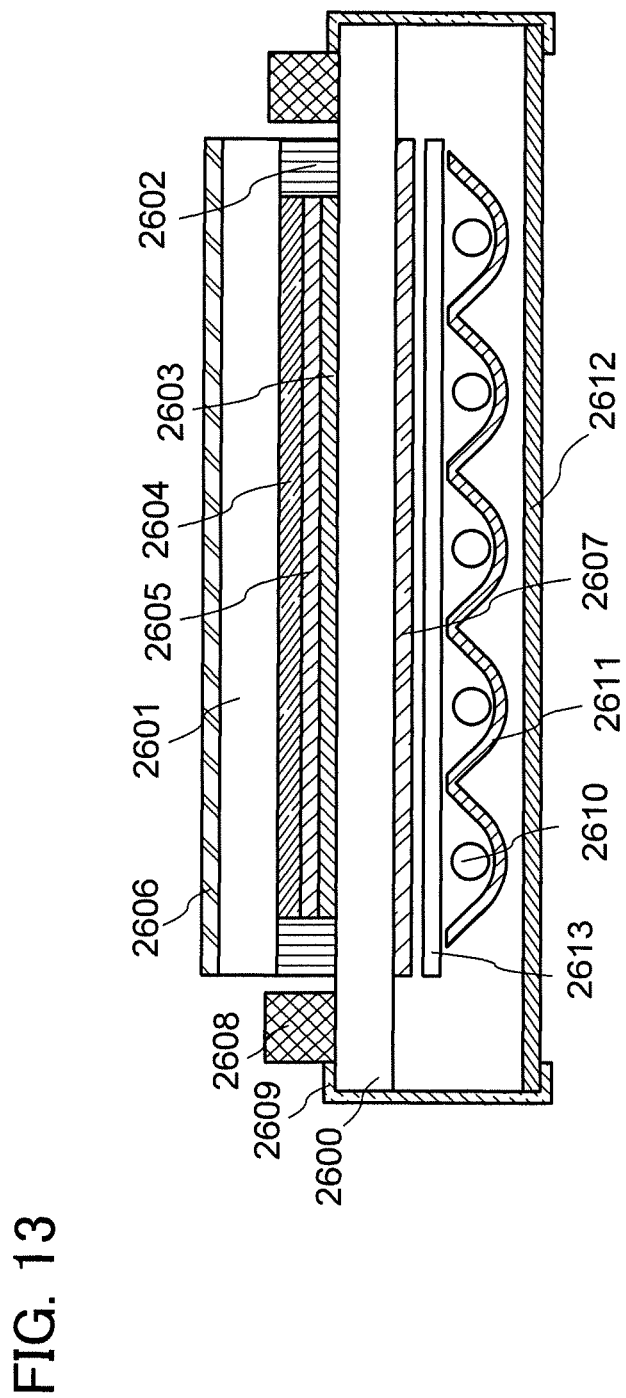
FIG. 13 illustrates a liquid crystal display module.

FIG. 13 illustrates an example of a liquid crystal display module which is formed as a liquid crystal display device disclosed in this specification.

FIG. 13 illustrates an example of a liquid crystal display module in which an element substrate 2600 and a counter substrate 2601 are firmly attached with a sealant 2602, and an element layer 2603 including a TFT and the like, a display element 2604 including a liquid crystal layer, and an interlayer film 2605 including a light-transmitting chromatic resin layer functioning as a color filter are provided between the element substrate 2600 and the counter substrate 2601. The interlayer film 2605 including a light-transmitting chromatic resin layer, which is included in a display region, is needed when color display is performed, and in the case of an RGB method, light-transmitting chromatic resin layers corresponding to red, green, and blue are provided in each pixel. Polarizing plates 2606 and 2607 and a diffuser plate 2613 are provided on an outer side of the counter substrate 2601 and the element substrate 2600. A light source includes a cold cathode tube 2610 and a reflective plate 2611, and a circuit substrate 2612 is connected to a wiring circuit portion 2608 of the element substrate 2600 through a flexible wiring board 2609 and includes an external circuit such as a control circuit or a power source circuit. As the light source, a white diode may be used.

Through the above process, a highly reliable liquid crystal display panel as a liquid crystal display device can be manufactured.

This embodiment can be implemented in appropriate combination with any of the structures described in the other embodiments.

(Embodiment 5)

A liquid crystal display device disclosed in this specification can be applied to a variety of electronic appliances (including an amusement machine). Examples of electronic appliances are a television set (also referred to as a television or a television receiver), a monitor of a computer or the like, a camera such as a digital camera or a digital video camera, a digital photo frame, a mobile phone handset (also referred to as a mobile phone or a mobile phone device), a portable game machine, a portable information terminal, an audio reproducing device, a large-sized game machine such as a pachinko machine, and the like.

Figure 15A:
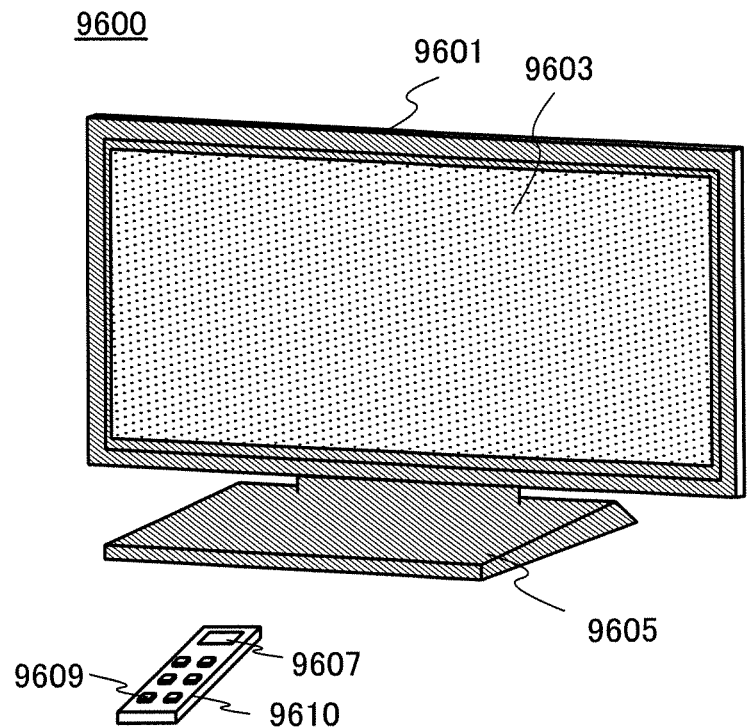
FIG. 15A is an external view of an example of a television set and FIG. 15B is an external view of an example of a digital photo frame.

FIG. 15A illustrates an example of a television set. In a television set 9600, a display portion 9603 is incorporated in a housing 9601. The display portion 9603 can display an image. Further, the housing 9601 is supported by a stand 9605 in this embodiment.

The television set 9600 can be operated by an operation switch of the housing 9601 or a separate remote controller 9610. Channels and volume can be controlled by operation keys 9609 of the remote controller 9610 so that an image displayed on the display portion 9603 can be controlled. Further, the remote controller 9610 may be provided with a display portion 9607 for displaying data output from the remote controller 9610.

Note that the television set 9600 is provided with a receiver, a modem, and the like. With the receiver, a general television broadcast can be received. Further, when the television set 9600 is connected to a communication network by wired or wireless connection via the modem, one-way (from a transmitter to a receiver) or two-way (between a transmitter and a receiver or between receivers) data communication can be performed.

Figure 15B:
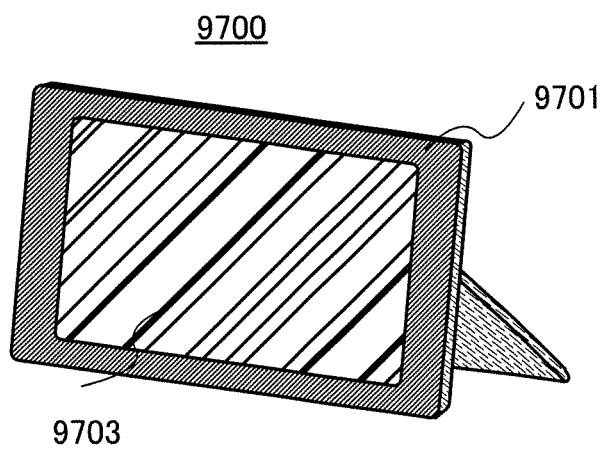

FIG. 15B illustrates an example of a digital photo frame. For example, in a digital photo frame 9700, a display portion 9703 is incorporated in a housing 9701. The display portion 9703 can display various images. For example, the display portion 9703 can display data of an image shot by a digital camera or the like to function as a normal photo frame.

Note that the digital photo frame 9700 is provided with an operation portion, an external connection terminal (a USB terminal, a terminal that can be connected to various cables such as a USB cable, or the like), a recording medium insertion portion, and the like. Although they may be provided on the surface on which the display portion is provided, it is preferable to provide them on the side surface or the back surface for the design of the digital photo frame 9700. For example, a memory storing data of an image shot by a digital camera is inserted in the recording medium insertion portion of the digital photo frame, whereby the image data can be transferred and displayed on the display portion 9703.

The digital photo frame 9700 may transmit and receive data wirelessly. The structure may be employed in which desired image data is transferred wirelessly to be displayed.

Figure 16A:
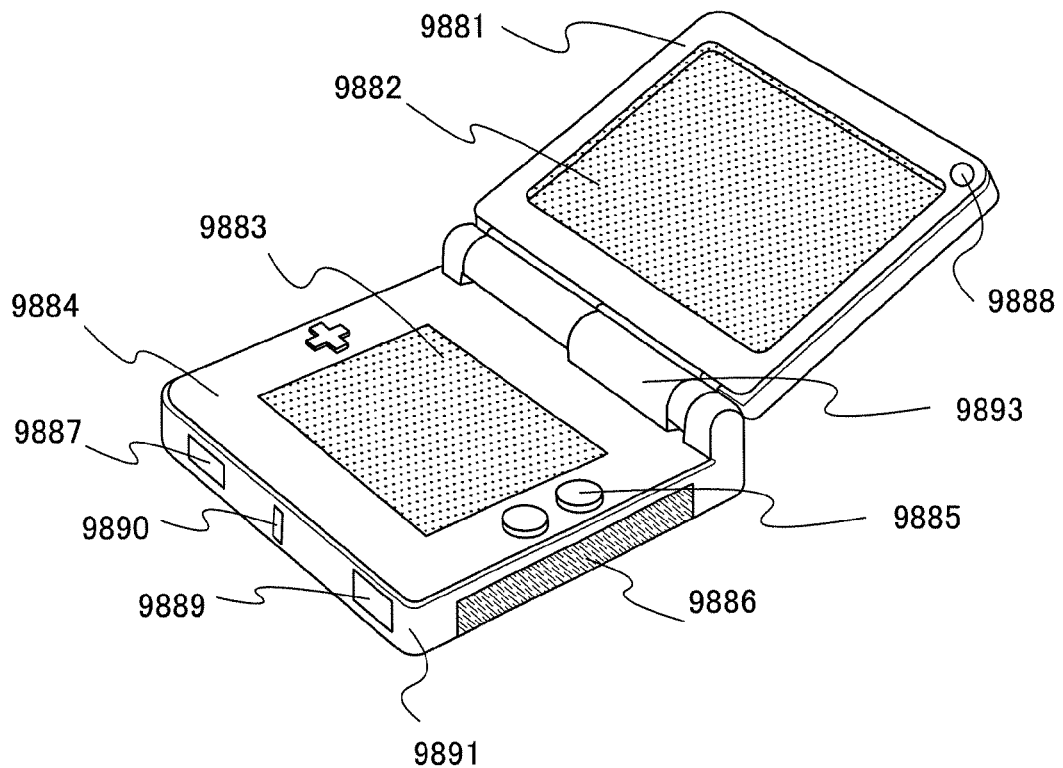
FIGS. 16A and 16B are external views of examples of amusement machines.

FIG. 16A illustrates a portable game machine including a housing 9881 and a housing 9891 which are jointed with a connector 9893 so as to be able to open and close. A display portion 9882 and a display portion 9883 are incorporated in the housing 9881 and the housing 9891, respectively. The portable game machine illustrated in FIG. 16A additionally includes a speaker portion 9884, a storage medium inserting portion 9886, an LED lamp 9890, an input means (operation keys 9885, a connection terminal 9887, a sensor 9888 (including a function of measuring force, displacement, position, speed, acceleration, angular speed, the number of rotations, distance, light, liquid, magnetism, temperature, chemical substance, sound, time. hardness, electric field, current, voltage, electric power, radiation, flow rate, humidity, tilt angle, vibration, smell, or infrared ray), a microphone 9889, and the like). Needless to say, the structure of the portable game machine is not limited to the above, and may be any structure as long as at least a liquid crystal display device disclosed in this specification is provided. Moreover, another accessory may be provided as appropriate. The portable game machine illustrated in FIG. 16A has a function of reading out a program or data stored in a storage medium to display it on the display portion, and a function of sharing information with another portable game machine by wireless communication. The portable game machine in FIG. 16A can have a variety of functions other than those above.

Figure 16B:
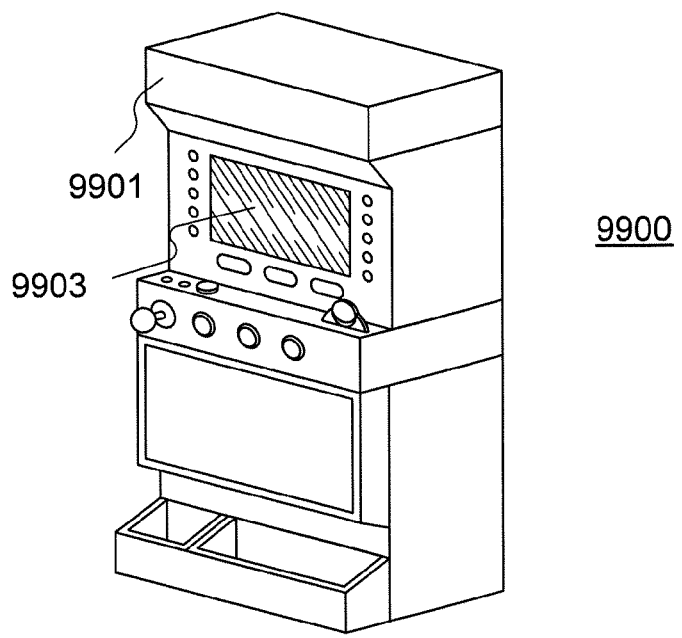

FIG. 16B illustrates an example of a slot machine, which is a large game machine. A display portion 9903 is incorporated in a housing 9901 of a slot machine 9900. The slot machine 9900 additionally includes an operation means such as a start lever or a stop switch, a coin slot, a speaker, and the like. Needless to say, the structure of the slot machine 9900 is not limited to the above, and may be any structure as long as at least a liquid crystal display device disclosed in this specification is provided. Moreover, another accessory may be provided as appropriate.

Figure 17A:
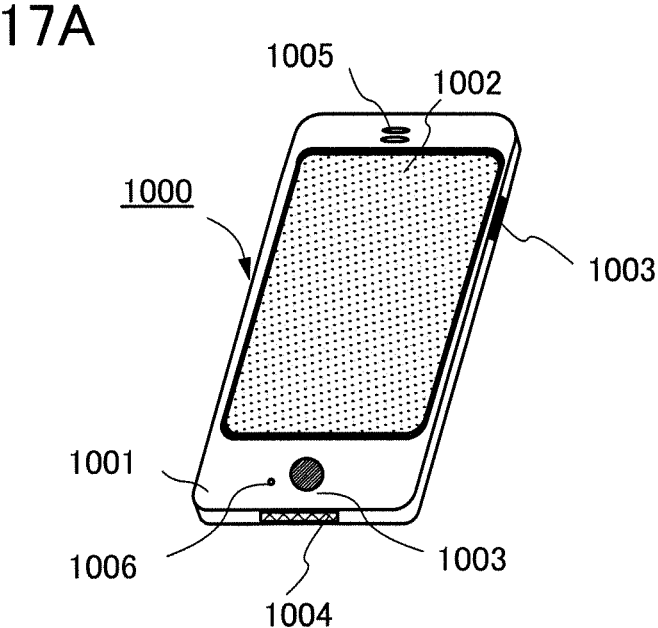
FIGS. 17A and 17B are external views of examples of mobile phones.

FIG. 17A illustrates an example of a mobile phone handset. A mobile phone handset 1000 is provided with a display portion 1002 incorporated in a housing 1001, operation buttons 1003, an external connection port 1004, a speaker 1005, a microphone 1006, and the like.

When the display portion 1002 of the mobile phone handset 1000 illustrated in FIG. 17A is touched with a finger or the like, data can be input into the mobile phone handset 1000. Further, operations such as making calls and composing mails can be performed by touching the display portion 1002 with a finger or the like.

There are mainly three screen modes of the display portion 1002. The first mode is a display mode mainly for displaying an image. The second mode is an input mode mainly for inputting data such as text. The third mode is a display-and-input mode in which two modes of the display mode and the input mode are combined.

For example, in the case of making a call or composing a mail, a text input mode mainly for inputting text is selected for the display portion 1002 so that text displayed on a screen can be input. In this case, it is preferable to display a keyboard or number buttons on almost all area of the screen of the display portion 1002.

When a detection device including a sensor for detecting inclination, such as a gyroscope or an acceleration sensor, is provided inside the mobile phone handset 1000, display in the screen of the display portion 1002 can be automatically switched by determining the direction of the mobile phone handset 1000 (whether the mobile phone handset 1000 is placed horizontally or vertically).

The screen modes are switched by touching the display portion 1002 or operating the operation button 1003 of the housing 1001. Alternatively, the screen modes may be switched depending on the kind of the image displayed on the display portion 1002. For example, when a signal of an image displayed on the display portion is the one of moving image data, the screen mode is switched to the display mode. When the signal is the one of text data, the screen mode is switched to the input mode.

Further, in the input mode, when input by touching the display portion 1002 is not performed for a certain period while a signal detected by the optical sensor in the display portion 1002 is detected, the screen mode may be controlled so as to be switched from the input mode to the display mode.

The display portion 1002 may function as an image sensor. For example, an image of the palm print, the fingerprint, or the like is taken by touching the display portion 1002 with the palm or the finger, whereby personal authentication can be performed. Further, by providing a backlight or sensing light source emitting a near-infrared light for the display portion, an image of a finger vein, a palm vein, or the like can be taken.

Figure 17B:
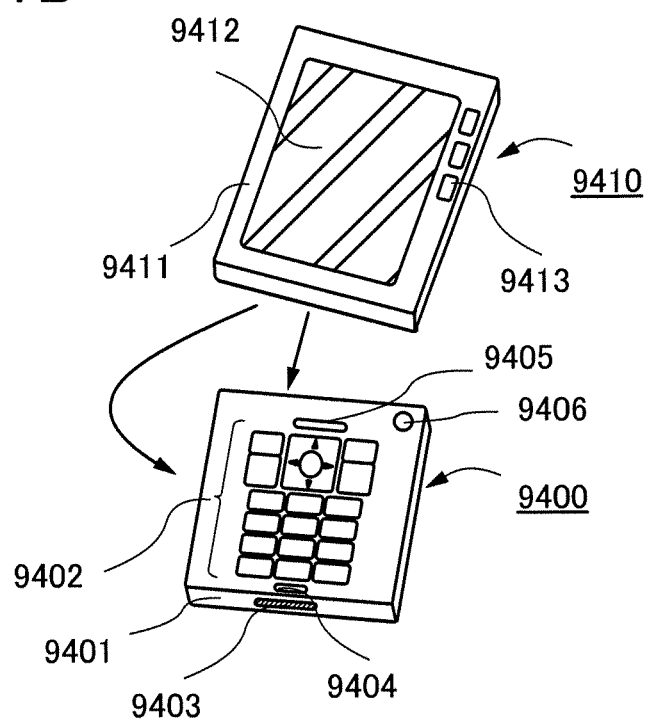

FIG. 17B also illustrates an example of a mobile phone. The mobile phone in FIG. 17B has a display device 9410 in a housing 9411, which includes a display portion 9412 and operation buttons 9413, and a communication device 9400 in a housing 9401, which includes operation buttons 9402, an external input terminal 9403, a microphone 9404, a speaker 9405, and a light-emitting portion 9406 that emits light when a phone call is received. The display device 9410 which has a display function can be detached from or attached to the communication device 9400 which has a phone function by being moved in two directions indicated by the arrows. Thus, the display device 9410 and the communication device 9400 can be attached to each other along their short sides or long sides. In addition, when only the display function is needed, the display device 9410 can be detached from the communication device 9400 and used alone. Images or input data can be transmitted or received by wireless or wire communication between the communication device 9400 and the display device 9410, each of which has a rechargeable battery.

This application is based on Japanese Patent Application Ser. No. 2010-116954 filed with the Japan Patent Office on May 21, 2010, the entire contents of which are hereby incorporated by reference.

What is claimed is:

1. A liquid crystal display device comprising:
a first substrate;
an interlayer film over the first substrate;
a first electrode layer over the interlayer film;
a second electrode layer over the interlayer film;
a first wall-like structure body over the first electrode layer;
a second wall-like structure body over the second electrode layer;
a dielectric film in direct contact with a side surface of the first electrode layer, a side surface of the second electrode layer, the first wall-like structure body, the second wall-like structure body, and the interlayer film;
a liquid crystal layer over the dielectric film;
a second substrate over the liquid crystal layer; and
a thin film transistor over the first substrate,
wherein a dielectric constant of the dielectric film is higher than a dielectric constant of each of the first wall-like structure body, the second wall-like structure body, and the liquid crystal layer,
wherein the liquid crystal layer comprises a liquid crystal material exhibiting a blue phase,
wherein the first electrode layer is over the thin film transistor,
wherein the first electrode layer is electrically connected to the thin film transistor,
wherein the second electrode layer is a common electrode layer and is over the thin film transistor, and
wherein the first electrode layer is a pixel electrode layer.

2. The liquid crystal display device according to claim 1, wherein the dielectric constant of each of the first wall-like structure body and the second wall-like structure body is lower than the dielectric constant of the liquid crystal layer.

3. The liquid crystal display device according to claim 1, wherein each of the first electrode layer and the second electrode layer has a comb-like shape.

4. The liquid crystal display device according to claim 1, further comprising:
a light-transmitting chromatic resin layer over the thin film transistor,
wherein the first electrode layer is over the light-transmitting chromatic resin layer, and
wherein the second electrode layer is over the light-transmitting chromatic resin layer.

5. The liquid crystal display device according to claim 1, wherein a thickness of the liquid crystal layer is greater than or equal to 5 μm and less than or equal to 20 μm,
wherein a thickness of the first wall-like structure body is greater than or equal to 1.0 μm,
wherein a thickness of the second wall-like structure body is greater than or equal to 1.0 μm, and
wherein a thickness of the dielectric film is greater than or equal to 100 nm.

6. The liquid crystal display device according to claim 1, wherein the dielectric constant of the dielectric film is higher than or equal to 12.

7. The liquid crystal display device according to claim 1, wherein the liquid crystal layer comprises at least one of a chiral agent, a photocurable resin, and a photopolymerization initiator.

8. A liquid crystal display device comprising:
a first substrate;
an interlayer film over the first substrate;
a first electrode layer over the interlayer film;
a second electrode layer over the interlayer film;
a first wall-like structure body over the first electrode layer;
a second wall-like structure body over the second electrode layer;
a dielectric film in direct contact with a side surface of the first electrode layer, a side surface of the second electrode layer the first wall-like structure body, the second wall-like structure body, and the interlayer film;
a liquid crystal layer over the dielectric film;
a second substrate over the liquid crystal layer; and
a thin film transistor over the first substrate,
wherein a dielectric constant of the dielectric film is higher than a dielectric constant of each of the first wall-like structure body, the second wall-like structure body, and the liquid crystal layer,
wherein the first electrode layer is over the thin film transistor,
wherein the first electrode layer is electrically connected to the thin film transistor,
wherein the second electrode layer is a common electrode layer and is over the thin film transistor, and
wherein the first electrode layer is a pixel electrode layer.

9. The liquid crystal display device according to claim 8, wherein the dielectric constant of each of the first wall-like structure body and the second wall-like structure body is lower than the dielectric constant of the liquid crystal layer.

10. The liquid crystal display device according to claim 8, wherein each of the first electrode layer and the second electrode layer has a comb-like shape.

11. The liquid crystal display device according to claim 8, further comprising:
a light-transmitting chromatic resin layer over the thin film transistor,
wherein the first electrode layer is over the light-transmitting chromatic resin layer, and
wherein the second electrode layer is over the light-transmitting chromatic resin layer.

12. The liquid crystal display device according to claim 8, wherein a thickness of the crystal layer is greater than or equal to 5 μm and less than or equal to 20 μm,
wherein a thickness of the first wall-like structure body is greater than or equal to 1.0 μm,
wherein a thickness of the second wall-like structure body is greater than or equal to 1.0 μm, and wherein a thickness of the dielectric film is greater than or equal to 100 nm.

13. The liquid crystal display device according to claim 8, further comprising:
a third wall-like structure body over the first substrate,
wherein the third wall-like structure body comprises a same material as at least one of the first wall-like structure body and the second wall-like structure body, and
wherein the third wall-like structure body is adjacent to the first electrode layer and the second electrode layer.

14. A liquid crystal display device comprising:
a first substrate:
an interlayer film over the first substrate;
a first electrode layer over the interlayer film;
a second electrode layer over the interlayer film;
a first wall-like structure body over the first electrode layer;
a second wall-like structure body over the second electrode layer;
a dielectric film in direct contact with a side surface of the first electrode layer, a side surface of the second electrode layer, the first wall-like structure body, the second wall-like structure body, and the interlayer film;
a liquid crystal layer over the dielectric film;
a second substrate over the liquid crystal layer; and
a thin film transistor over the first substrate,
wherein a dielectric constant of the dielectric film is higher than a dielectric constant of each of the first wall-like structure body, the second wall-like structure body, and the liquid crystal layer,
wherein the dielectric film is in contact with the second substrate,
wherein the first electrode layer is over the thin film transistor,
wherein the first electrode layer is electrically connected to the thin film transistor,
wherein the second electrode layer is a common electrode layer and is over the thin film transistor, and
wherein the first electrode layer is a pixel electrode layer.

15. The liquid crystal display device according to claim 14, wherein the dielectric constant of each of the first wall-like structure body and the second wall-like structure body is lower than the dielectric constant of the liquid crystal layer.

16. The liquid crystal display device according to claim 14, wherein each of the first electrode layer and the second electrode layer has a comb-like shape.

17. The liquid crystal display device according to claim 14, further comprising:
a light-transmitting chromatic resin layer over the thin film transistor,
wherein the first electrode layer is over the light-transmitting chromatic resin layer, and
wherein the second electrode layer is over the light-transmitting chromatic resin layer.

* * * * *

UNITED STATES PATENT AND TRADEMARK OFFICE
CERTIFICATE OF CORRECTION

PATENT NO. : 8,928,846 B2
APPLICATION NO. : 13/104221
DATED : January 6, 2015
INVENTOR(S) : Daisuke Kubota et al.

Page 1 of 1

It is certified that error appears in the above-identified patent and that said Letters Patent is hereby corrected as shown below:

In the Specification:

Column 20, line 1, "waft-like structure body" should read --wall-like structure body--;

Column 24, line 29, "at division step" should read --a division step--;

Column 26, line 24, "scandium (Se)" should read --scandium (Sc)--;

Column 27, line 57, "FIGS. 3A and 313" should read --FIGS. 3A and 3B--;

Column 28, line 57, "454e" should read --454c--;

Column 32, line 61, "1213 and FIG. 18" should read --12B and FIG. 18--;

Column 34, line 26, "1213 and FIG. 18" should read --12B and FIG. 18--;

In the Claims:

Column 38, lines 28-29, Claim 8, "second electrode layer the first wall-like" should read --second electrode layer, the first wall-like--;

Column 38, line 62, Claim 12, "the crystal layer" should read --the liquid crystal layer--;

Column 39, line 12, Claim 14, "a first substrate:" should read --a first substrate;-- and Column 39, line 19, Claim 14, "first electrode laver" should read --first electrode layer--.

Signed and Sealed this
Fifth Day of May, 2015

Michelle K. Lee
*Director of the United States Patent and Trademark Office*